US010688570B2

(12) United States Patent
Kiuchi et al.

(10) Patent No.: US 10,688,570 B2
(45) Date of Patent: Jun. 23, 2020

(54) INDEXABLE ROTARY CUTTING TOOL AND INSERT

(71) Applicant: Mitsubishi Hitachi Tool Engineering, Ltd., Tokyo (JP)

(72) Inventors: Yasuhiro Kiuchi, Narita (JP); Yoshiyuki Kobayashi, Narita (JP); Takao Nakamigawa, Narita (JP); Fumihiko Inagaki, Narita (JP); Yuuki Hayashi, Narita (JP)

(73) Assignee: Mitsubishi Hitachi Tool Engineering, LTD., Tokyo (JP)

( * ) Notice: Subject to any disclaimer, the term of this patent is extended or adjusted under 35 U.S.C. 154(b) by 0 days.

(21) Appl. No.: 16/076,495

(22) PCT Filed: Aug. 19, 2016

(86) PCT No.: PCT/JP2016/074255
§ 371 (c)(1),
(2) Date: Aug. 8, 2018

(87) PCT Pub. No.: WO2017/138170
PCT Pub. Date: Aug. 17, 2017

(65) Prior Publication Data
US 2019/0047062 A1     Feb. 14, 2019

(30) Foreign Application Priority Data
Feb. 12, 2016   (JP) .................. 2016-025175

(51) Int. Cl.
*B23C 5/10* (2006.01)
*B23C 5/20* (2006.01)
(Continued)

(52) U.S. Cl.
CPC ............ *B23C 5/2208* (2013.01); *B23C 5/003* (2013.01); *B23C 5/109* (2013.01);
(Continued)

(58) Field of Classification Search
CPC ........ B23C 2200/203; B23C 2210/503; B23C 2210/74; B23C 5/10; B23C 5/109;
(Continued)

(56) References Cited

U.S. PATENT DOCUMENTS 5,348,426 A * 9/1994 Krupp ................... B23C 5/1036
407/40
5,580,194 A * 12/1996 Satran ................... B23C 5/1036
407/40
(Continued)

FOREIGN PATENT DOCUMENTS

CN     1316931 A     10/2001
CN   102266975 A     12/2011
(Continued)

OTHER PUBLICATIONS

International Search Report dated Sep. 13, 2016, issued for PCT/JP2016/074255 and English translation thereof.
(Continued)

*Primary Examiner* — Sara Addisu
(74) *Attorney, Agent, or Firm* — Locke Lord LLP

(57) ABSTRACT

An indexable rotary cutting tool and insert is capable of performing a high-accuracy cutting process with high efficiency. A twist angle of an outer peripheral cutting edge of the tool has a positive value, an axial rake angle of the cutting edge of a corner R of the tool at a boundary point between the cutting edge of the corner R and the outer peripheral cutting edge has a positive value, the axial rake angle of the cutting edge of the corner R at a reference point has a negative value, and the radial rake angle at least between the boundary point and the reference point in an entire edge length region of the cutting edge of the corner R
(Continued)

has a negative value. The radial rake angle at the reference point is smaller than the radial rake angle at the boundary point.

10 Claims, 16 Drawing Sheets

(51) Int. Cl.
  *B23C 5/22* (2006.01)
  *B23C 5/00* (2006.01)
(52) U.S. Cl.
  CPC ............... *B23C 2200/0444* (2013.01); *B23C 2200/086* (2013.01); *B23C 2200/087* (2013.01); *B23C 2200/203* (2013.01); *B23C 2200/243* (2013.01); *B23C 2200/28* (2013.01); *B23C 2200/283* (2013.01); *B23C 2200/326* (2013.01); *B23C 2200/361* (2013.01); *B23C 2210/045* (2013.01); *B23C 2210/0414* (2013.01); *B23C 2210/0428* (2013.01); *B23C 2210/0435* (2013.01); *B23C 2210/0485* (2013.01); *B23C 2210/082* (2013.01); *B23C 2210/084* (2013.01); *B23C 2210/123* (2013.01); *B23C 2210/503* (2013.01); *B23C 2210/74* (2013.01); *B23C 2250/16* (2013.01)
(58) Field of Classification Search
  CPC ....... B23C 5/20; B23C 5/22; B23C 2200/086; B23C 2200/283; B23C 2200/326; B23C 2200/361; B23C 2250/16; B23C 5/003; B23C 5/2208
  See application file for complete search history.

(56) References Cited

U.S. PATENT DOCUMENTS

| | | | | |
|---|---|---|---|---|
| 5,782,589 A | * | 7/1998 | Cole | ..................... B23B 51/048 407/33 |
| 5,915,888 A | * | 6/1999 | Minicozzi | ............. B23C 5/1036 407/113 |
| 6,582,165 B1 | * | 6/2003 | Baba | ..................... B23C 5/1036 407/40 |
| 2006/0060053 A1 | * | 3/2006 | Tanaka | ...................... B23C 5/10 83/663 |
| 2006/0093445 A1 | * | 5/2006 | Tsuchitani | ............ B23C 5/1036 407/54 |
| 2011/0008112 A1 | | 1/2011 | Abe | |
| 2013/0071192 A1 | * | 3/2013 | Kuroda | ..................... B23C 5/10 407/54 |
| 2014/0205389 A1 | * | 7/2014 | Azegami | ................... B23C 5/10 407/46 |
| 2016/0214186 A1 | | 7/2016 | Mura et al. | |
| 2019/0160560 A1 | * | 5/2019 | Kobayashi | ................ B23C 5/20 |
| 2019/0210123 A1 | * | 7/2019 | Kobayashi | ................ B23C 5/10 |

FOREIGN PATENT DOCUMENTS

| | | |
|---|---|---|
| CN | 202155588 U | 3/2012 |
| CN | 102451930 A | 5/2012 |
| CN | 203738106 U | 7/2014 |
| CN | 204486822 U | 7/2015 |
| EP | 1348508 A1 | 10/2003 |
| EP | 1591183 A1 | 11/2005 |
| EP | 2258505 A1 | 12/2010 |
| JP | 2003-071626 A | 3/2003 |
| JP | 2004-050338 A | 2/2004 |
| JP | 2011-020192 A | 2/2011 |
| JP | 2014-097574 A | 5/2014 |
| JP | 2015-000467 A | 1/2015 |
| WO | 2009/123192 A1 | 10/2009 |
| WO | 2015/037617 A1 | 3/2015 |

OTHER PUBLICATIONS

First Office Action prepared by the State Intellectual Property Office of People's Republic of China, dated Jan. 2, 2019, issued in corresponding Chinese Patent Application No. 201680070924.6.
European Search Report dated Sep. 11, 2019 for corresponding European Application No. 16889871.6.

* cited by examiner

| | STANDING WALL SIDE PART CONTOUR MACHINING | FACE MILLING MACHINING |
|---|---|---|
| EXAMPLE 1 OF THE PRESENT INVENTION |  |  |
| COMPARATIVE EXAMPLE 2 |  |  |
| CONVENTIONAL EXAMPLE 3 |  |  |

| OBSERVATION OF CUTTING EDGE | CUTTING DISTANCE (m) | | | FINAL APPEARANCE | |
|---|---|---|---|---|---|
| | 7.5 | 150 | CUTTING DISTANCE (m) | FINAL DAMAGE APPEARANCE | |
| EXAMPLE 1 OF THE PRESENT INVENTION |  |  | 275 |  | |
| COMPARATIVE EXAMPLE 2 |  | | 224 | | |

# INDEXABLE ROTARY CUTTING TOOL AND INSERT

TECHNICAL FIELD

The present invention relates to an indexable rotary cutting tool to which a cutting insert suitable for performing a face milling process (surface processing) or a side finishing process on a workpiece is attached and an insert.

Priority is claimed on Japanese Patent Application No. 2016-025175 filed on Feb. 12, 2016, the contents of which are incorporated herein by reference.

BACKGROUND ART

Hitherto, for example, a solid type radius end mill disclosed in Patent Document 1 below has been used at the time of performing a face milling process or a side finishing process on, for example, a workpiece such as a die.

Further, an indexable radius end mill including a columnar holder body which is rotated about a rotation center axis and an insert which is detachably attached to a slit formed on a tip end portion of the holder body and is disposed so that a cutting edge portion protrudes outward in a radial direction and toward the front end from the tip end portion of the holder body is known.

The cutting edge portion of the indexable radius end mill includes an outer peripheral cutting edge which extends along a rotation center axis direction, a bottom cutting edge which extends along a radial direction orthogonal to the rotation center axis, and a cutting edge of a corner R which connects an outer end of the bottom cutting edge in the radial direction to a front end of the outer peripheral cutting edge in the rotation center axis direction and is formed in an arc shape to protrude outward from the periphery of the tip end portion of the holder body.

CITATION LIST

Patent Document

[Patent Document 1] Japanese Unexamined Patent Application, First Publication No. 2014-97574

SUMMARY OF INVENTION

Technical Problem

However, this conventional indexable radius end mill has the following problems.

For example, when a deep engraving process or a profiling process such as a contour process is performed on a workpiece, a tool protrusion length may be set to being long. A "long tool protrusion length" indicates, for example, a case in which L/D is 4 or more, where a value L indicates the length of the tool in the rotation center axis direction and the value D indicates the diameter of the rotation locus of the tool cutting edge.

Further, there is a case in which a metal material (so-called viscous material) with high-toughness, a high-hardness material (for example, a material with a Rockwell hardness of 40 HRC or more), or the like is used as the workpiece. Additionally, for such a workpiece, for example, high-performance die steel having high ductility such as DAC-MAGIC (registered trademark) manufactured by Hitachi Metals Co., Ltd. and DH31 manufactured by Daido Steel Co., Ltd. can be exemplified.

At the time of performing a cutting process on a workpiece in such cutting conditions, a phenomenon in which the front end of the cutting edge is pulled so as to get into the workpiece (is put in an excessively biting state) may easily occur in biting on the workpiece in the vicinity of the bottom cutting edge performing a face milling machining on a surface of the workpiece (for example, a bottom surface of a recess to be deeply engraved on a die which is a workpiece) among the cutting edge of the corner R may easily occur. When the cutting edge is put in the excessively biting state, chipping or chattering vibration easily occurs.

Further, in the vicinity of the outer peripheral cutting edge performing a side finishing process on an upright wall surface (for example, an inner wall surface or the like of the recess) of the workpiece in the cutting edge of the corner R, a reaction force (a force separating the tool from the upright wall surface) is applied from the workpiece to the tool during the cutting process. Particularly, in a process performed with a long tool protrusion length, the tool is easily bent due to the reaction force in the tool radial direction.

The present invention has been made in view of the above-described circumstances and an object of the present invention is to provide an indexable rotary cutting tool and an insert capable of stably performing a high-accuracy cutting process with high efficiency for a long period of time by preventing chattering vibration or bending and chipping even when a cutting process is performed on a workpiece formed of a high-toughness metal material or a high-hardness material while a tool protrusion length is long (for example, L/D is 4 or more).

Solution to Problem

An aspect of the present invention is an indexable rotary cutting tool (hereinafter, referred to as an "indexable rotary cutting tool of the present invention") including: a tool body; and an insert having a cutting edge portion, the insert being detachably mounted on a mounting seat provided at a tip end portion of the tool main body, wherein the mounting seat includes: a insert fit groove in a slit shape which is formed at the tip end portion of the tool main body to extend in a radial direction orthogonal to a rotation center axis including a tool rotation center axis; and a clamp screw configure to fix the insert inserted into the insert fit groove, wherein the cutting edge portion of the insert includes: an outer peripheral cutting edge which extends along the rotation center axis direction; a rake face of the outer peripheral cutting edge; a bottom cutting edge which extends along the radial direction; a rake face of the bottom cutting edge; a cutting edge of a corner R which connects an outer end of the bottom cutting edge in the radial direction to a front end of the outer peripheral cutting edge in the rotation center axis direction and is formed in an arc shape to protrude toward an outer peripheral side of the tip end portion of the tool main body; a rake face of the cutting edge of the corner R; a chamfered surface which is formed in at least the rake face of the cutting edge of the corner R; a chip removal groove which is formed at a base end side of the rake face of the bottom cutting edge in the rotation center axis direction; and a chip removal groove which is formed at the inside of the rake face of the outer peripheral cutting edge in the radial direction, and wherein, within a virtual plane, which is perpendicular to a reference plane including a predetermined point on the cutting edge of the corner R and the rotation center axis; and includes a virtual straight line passing through an arc center point of the cutting edge of the corner R and the predetermined point, a true rake angle corresponding to an angle in which the rake face of the cutting edge of the corner R is inclined with respect to the reference plane is defined as a radial rake angle, an angle in which the virtual straight line projected to the reference plane is inclined with respect to the rotation center axis within the reference plane is defined as a radial angle, a point in which the virtual straight line inclined by the radial angle of 5° intersects the cutting edge of the corner R is defined as a reference point, and wherein a twist angle of the outer peripheral cutting edge has a positive value, an axial rake angle of the cutting edge of the corner R at a boundary point between the cutting edge of the corner R and the outer peripheral cutting edge has a positive value, the axial rake angle of the cutting edge of the corner R at the reference point has a negative value, at least the radial rake angle in a region between the boundary point and the reference point in an entire edge length region of the cutting edge of the corner R has a negative value, and the radial rake angle of the cutting edge of the corner R at the reference point is smaller than the radial rake angle of the cutting edge of the corner R at the boundary point.

Further, an insert according to an aspect of the present invention (hereinafter, referred to as an "insert of the present invention") is used in the indexable rotary cutting tool.

In the indexable rotary cutting tool and the insert of the present invention, the twist angle of the outer peripheral cutting edge has a positive value and the axial rake angle of the cutting edge of the corner R at the boundary point (the outermost peripheral position) between the outer peripheral cutting edge and the arc-shaped cutting edge of the corner R also has a positive value. That is, the twist angle of the outer peripheral cutting edge and the axial rake angle in the vicinity of the outer peripheral cutting edge in the cutting edge of the corner R are also positive angles.

Thus, since chips generated during the cutting process are efficiently fed from the front end of the tool to the base end side, the chip discharge performance is good. Since the chip discharge performance is kept satisfactory particularly at the time of performing a side finishing process on an upright wall surface (for example, an inner wall surface of a recess to be deeply engraved on a die as a workpiece and generally a wall surface or vertical surface perpendicular to the horizontal plane) of the workpiece, it is possible to improve the cutting speed and the processing efficiency.

Further, at the reference point away from the boundary point (the frontmost end position) between the cutting edge of the corner R and the bottom cutting edge by the radial angle of 5° toward the outer peripheral cutting edge on the cutting edge of the corner R, the axial rake angle of the cutting edge of the corner R has a negative value. That is, the axial rake angle in the vicinity of the bottom cutting edge of the cutting edge of the corner R is a negative angle.

Additionally, as for the definition of the radial angle for the indexable rotary cutting tool of the present invention, the "virtual straight line projected to the reference plane" indicates the virtual straight line projected in a direction perpendicular to the reference plane.

The vicinity of the bottom cutting edge of the cutting edge of the corner R is a portion biting into the workpiece at the time of performing a face milling process on a plane (for example, a bottom surface of a recess to be deeply engraved on a die as a workpiece and generally a horizontal plane) of the workpiece. That is, in the indexable rotary cutting tool of the present invention, since a portion biting into the workpiece in the cutting edge of the corner R during the planar process has a negative angle, it is possible to prevent the chipping by preventing a phenomenon in which the front end of the cutting edge is pulled to get into the workpiece (the biting of the cutting edge).

Further, when the axial rake angle in the vicinity of the bottom cutting edge of the cutting edge of the corner R has a negative angle, a reaction force is easily applied from the surface of the workpiece (work surface) to the tool toward the base end side in the rotation center axis direction. That is, since a cutting resistance (a compressing force) of compressing the tool in the rotation center axis direction is exerted at all times during a cutting process, it is possible to effectively prevent chattering vibration even in a cutting process in which the tool protruding length is particularly long (for example, L/D is 4 or more) and to improve the work surface accuracy.

Furthermore, as described above, when the axial rake angle at the boundary point between the cutting edge of the corner R and the outer peripheral cutting edge in the cutting edge of the corner R is set to a positive value and the axial rake angle at the reference point is set to a negative value, the rotationally most projecting point in which the axial rake angle changes from a positive value to a negative value is formed in the region (the intermediate portion) located between the boundary point and the reference point in the cutting edge of the corner R.

The rotationally most projecting point is disposed to protrude furthest in the tool rotation direction in the entire edge length region of the cutting edge of the corner R and the outer peripheral cutting edge.

The rotationally most projecting point of the cutting edge of the corner R corresponds to a portion which bites into the workpiece first during the cutting process. Since the cutting edge of the corner R is formed in an arc shape, the rotationally most projecting point disposed on the cutting edge of the corner R is also formed in an arc shape which protrudes in the tool rotation direction. For this reason, since it is possible to improve the impact resistance at the time of biting even when the rotationally most projecting point is located at, for example, the boundary portion of the cutting edge cutting out a work hardened layer of a workpiece, it is possible to secure the cutting edge strength.

Further, the radial rake angle in a region to the reference point from at least the boundary point between the cutting edge of the corner R and the outer peripheral cutting edge in the entire edge length region of the cutting edge of the corner R has a negative value. That is, the radial rake angle is set to a negative angle over substantially the entire region of the cutting edge of the corner R (the region of 85° or more in the central angle 90° of the cutting edge of the corner R).

Accordingly, since it is possible to secure a large cutting angle of the cutting edge of the corner R in the substantially entire edge length region, it is possible to significantly improve the cutting edge strength. Particularly, at the time of performing a copying process such as a contour machining, a locally strong impact is applied to each position on the edge length region of the cutting edge of the corner R, but in such a case, the chipping of the cutting edge can be stably prevented.

Further, the radial rake angle of the cutting edge of the corner R is set to be small at the reference point in relation to the boundary point between the cutting edge of the corner R and the outer peripheral cutting edge. That is, since the radial rake angle of the reference point located in the vicinity of the bottom cutting edge in the cutting edge of the corner R is set to a negative value and a small value, an effect of preventing chattering vibration or chipping by preventing the biting of the cutting edge during the planar process becomes particularly noticeable.

In particular, even in the case of cutting a metal material (so-called viscous material) with high-toughness, a high-hardness material (for example, a material with Rockwell hardness of 40 HRC or more), or the like as a workpiece, the cutting edge strength is sufficiently secured, the tool life is prolonged, and the quality of the work surface is maintained satisfactorily. Additionally, as such a workpiece, for example, high-performance die steel having high ductility such as DAC-MAGIC (registered trademark) manufactured by Hitachi Metals Co., Ltd. and DH31 manufactured by Daido Steel Co., Ltd. can be exemplified.

Further, the radial rake angle of the cutting edge of the corner at the boundary point between the cutting edge of the corner and the outer peripheral cutting edge can be closer to a positive angle in relation to the reference point while having a negative value. Accordingly, since it is possible to secure sharpness in the vicinity of the outer peripheral cutting edge in the cutting edge of the corner during a side finishing process, it is possible to improve the biting at the upright wall surface.

Thus, a reaction force (a force separating the tool from the upright wall surface) is not easily applied from the workpiece to the tool during the cutting process. Particularly, even in a cutting tool in which a tool protruding length is long, a reaction force is not easily applied in the tool radial direction. For this reason, it is possible to remarkably prevent bending of the tool and to improve the work surface accuracy of the upright wall surface.

According to the present invention, since it is possible to prevent the chattering vibration or bending and to prevent the chipping even when a cutting process is performed on a workpiece formed of a high-toughness metal material or a high-hardness material with a long tool protruding length (for example, L/D is 4 or more), it is possible to prevent the chattering vibration or bending and to prevent the chipping. Accordingly, it is possible to stably perform a cutting process with a high accuracy. Further, since it is possible to prevent the chattering vibration or bending and to improve the cutting edge strength in this way, it is possible to improve the cutting speed and the processing efficiency.

Further, in the indexable rotary cutting tool, the radial rake angle may be set to a negative value in the entire edge length region of the cutting edge of the corner R.

In this case, since the radial rake angle is a negative angle in the entire region of the central angle of 90° of the cutting edge of the corner, a large cutting angle for the cutting edge of the corner can be secured in the entire edge length region and thus the cutting edge strength can be reliably improved. Thus, it is possible to more reliably prevent the chipping of the cutting edge of the corner R regardless of the type of cutting process.

Further, in the indexable rotary cutting tool, the chamfered surface may include the entire edge length region of the cutting edge of the corner R.

In this case, even when chips are generated at any portion of the edge length region of the cutting edge of the corner during the cutting process, the chips rub against the chamfered surface and are discharged. Thus, since the rake face of the cutting edge of the corner is simply formed by the chamfered surface formed as one flat or curved surface, it is possible to stabilize the chip discharge performance.

Further, since the rake face of the cutting edge of the corner can be formed by one chamfered surface, it is possible to prevent a sudden change in cutting angle in the entire edge length region of the cutting edge of the corner and to more stably improve the cutting edge strength.

Further, since it is possible to simply form the cutting edge of the corner R by one step in such a manner that the chamfered surface is ground by gash machining at the time of manufacturing the tool, the tool is easily manufactured. That is, in this case, the chamfered surface can be also called corner R gash.

Further, in the indexable rotary cutting tool, the chamfered surface may extend in the rake face of the outer peripheral edge beyond the boundary point between the cutting edge of the corner R and the outer peripheral cutting edge toward a base end side in the rotation center axis direction from the rake face of the cutting edge of the corner R.

In general, since the boundary point between the cutting edge of the corner R and the outer peripheral cutting edge is a portion in which two cutting edges having different shapes are connected to each other, the axial rake angle, the radial rake angle, or the cutting angle changes from the front end side to the base end side in the rotation center axis direction with the boundary point interposed therebetween. For this reason, a cutting load in the vicinity of the boundary point easily increases during the cutting process.

Here, in the embodiment, the chamfered surface is formed on the rake face of the outer peripheral cutting edge beyond the boundary point from the rake face of the cutting edge of the corner R. That is, in this case, the rake face of the cutting edge is formed by one chamfered surface in the vicinity of the boundary point.

Accordingly, since it is possible to prevent a large change in the axial rake angle, the radial rake angle, or the cutting angle at the front end side to the base end side in the rotation center axis direction with the boundary point interposed therebetween, it is possible to prevent a large cutting load from being applied to the vicinity of the boundary point. Thus, it is possible to remarkably improve the cutting edge strength of the connection portion between the cutting edge of the corner R and the outer peripheral cutting edge and to prolong the tool life.

Additionally, for example, when the cutting amount (ap) in the rotation center axis direction during the cutting process is set to be the same as the radius of the cutting edge of the corner R, the vicinity of the boundary point cuts into the work hardened layer processed immediately before so that the cutting load in the vicinity of the boundary point easily increases. However, according to the configuration of the indexable rotary cutting tool, the cutting edge strength of the cutting edge is sufficiently secured even in such a case.

Further, in the indexable rotary cutting tool, a length in which the chamfered surface extends toward the base end side in the rotation center axis direction from the boundary point between the cutting edge of the corner R and the outer peripheral cutting edge may equal to or more than 0.02 r and equal to or smaller than 0.5 r in a condition that a radius of the cutting edge of the corner R is indicated by r.

In this case, since the length in which the chamfered surface extends to the rake face of the outer peripheral cutting edge beyond the boundary point between the cutting edge of the corner R and the outer peripheral cutting edge to the base end side in the rotation center axis direction from the rake face of the cutting edge of the corner R is set to be equal to or larger than 0.02 r and equal to or smaller than 0.5 r in terms of the distance from the boundary point, it is possible to prevent a decrease in tool diameter while obtaining an effect of reducing a cutting load in the vicinity of the boundary point.

Since the length is 0.02 r or more and the boundary point between the cutting edge of the corner R and the outer peripheral cutting edge is a portion in which two cutting edges having different shapes are connected to each other, a large change in the axial rake angle, the radial rake angle, or the cutting angle at the front end side and the base end side in the rotation center axis direction with the boundary point interposed therebetween is prevented. As a result, it is possible to expect that a large cutting load applied to the vicinity of the boundary point during the cutting process can be prevented.

Since the length is 0.02 r or more, it is possible to reliably prevent a large change in the axial rake angle, the radial rake angle, or the cutting angle in the vicinity of the boundary point between the cutting edge of the corner R and the outer peripheral cutting edge. As a result, it is possible to obtain an effect of reducing a cutting load in the vicinity of the boundary point.

Further, since the length is 0.1 r or more, it is possible to reliably prevent a large change in the axial rake angle, the radial rake angle, or the cutting angle in the vicinity of the boundary point between the cutting edge of the corner R and the outer peripheral cutting edge and thus further stabilize an effect of reducing a cutting load.

Further, since the length is 0.5 r or less, it is possible to prevent a problem in which the outer peripheral cutting edge is excessively retracted in the direction opposite to the tool rotation direction by forming the chamfered surface. That is, the flank angle is generally given to the flank face of the outer peripheral cutting edge. For this reason, when a large chamfered surface is formed on the rake face of the outer peripheral cutting edge, the outer peripheral cutting edge is retracted in the direction opposite to the tool rotation direction R due to the large chamfered surface. In this case, this is not desirable in that the outer diameter of the outer peripheral cutting edge decreases as the outer diameter influences the processing accuracy. Here, since the length W is set to 0.5 r or less, it is possible to prevent a decrease in tool diameter sufficient to influence the cutting accuracy.

Further, in the indexable rotary cutting tool, the chamfered surface may extend in the rake face of the bottom cutting edge beyond the boundary point between the cutting edge of the corner R and the bottom cutting edge inward in the radial direction from the rake face of the cutting edge of the corner R.

In general, since the boundary point between the cutting edge of the corner R and the bottom cutting edge is a portion in which two cutting edges having different shapes are connected to each other, the axial rake angle, the radial rake angle, or the cutting angle changes at the inside and the outside in the radial direction with the boundary point interposed therebetween. For this reason, a cutting load in the vicinity of the boundary point easily increases during the cutting process.

Here, in the indexable rotary cutting tool, the chamfered surface is formed on the rake face of the bottom cutting edge beyond the boundary point from the rake face of the cutting edge of the corner R. That is, in this case, the rake face of the cutting edge is formed by one chamfered surface in the vicinity of the boundary point.

Accordingly, since it is possible to prevent a large change in the axial rake angle, the radial rake angle, or the cutting angle at the inside and outside in the radial direction with the boundary point interposed therebetween, it is possible to prevent a large cutting load from being applied to the vicinity of the boundary point. Thus, it is possible to remarkably improve the cutting edge strength of the connection portion between the cutting edge of the corner R and the bottom cutting edge and to prolong the tool life.

Further, in the indexable rotary cutting tool, a rotationally most projecting point which protrudes furthest toward a tool rotation direction in a circumferential direction about the rotation center axis may be disposed on the cutting edge of the corner R among the cutting edge of the corner R and the outer peripheral cutting edge, and wherein the rotationally most projecting point is disposed in a range of the radial angle of 40° or more and 55° or less on the cutting edge of the corner R.

According to the indexable rotary cutting tool, since the rotationally most projecting point of the cutting edge of the corner R is disposed in a range of a radial angle of 40° to 55°, it is possible to improve the chip discharge performance while obtaining the above-described effect in a state where the axial rake angle in the vicinity of the bottom cutting edge of the cutting edge of the corner R is reliably set to a negative angle.

That is, since the rotationally most projecting point of the cutting edge of the corner R is located at the position of a radial angle of 40° or more, it is possible to prevent the rotationally most projecting point from approaching the bottom cutting edge and to reliably set the axial rake angle at the reference point of the cutting edge of the corner R to a negative value. Accordingly, it is possible to stably obtain an effect of preventing the chipping or an effect of preventing the chattering vibration.

Further, as for the cutting started from the rotationally most projecting point of the cutting edge of the corner R during the cutting process, the cutting range is enlarged at the front end side and the base end side in the rotation center axis direction along with the rotation of the tool. That is, since the axial rake angle of the front end side portion in relation to the rotationally most projecting point of the cutting edge of the corner R is set to a negative angle, chips tend to be directed toward the front end side of the tool. Further, since the axial rake angles at the base end side portion in relation to the rotationally most projecting point of the cutting edge of the corner R and the outer peripheral cutting edge are set to a positive angle, chips are directed to the base end side of the tool.

Then, since the rotationally most projecting point of the cutting edge of the corner R is located at a position of a radial angle of 55° or less, the rotationally most projecting point can approach the front end side of the tool in the cutting edge of the corner R. Accordingly, it is possible to improve the chip discharge performance while increasing the ratio of the amount of chips discharged toward the base end side of the tool.

Further, in the indexable rotary cutting tool, a size of the axial rake angle of the cutting edge of the corner R at the boundary point between the cutting edge of the corner R and the outer peripheral cutting edge may be 90% or more and 110% or less in a condition that a size of the twist angle of the outer peripheral cutting edge is 100%.

In general, since the boundary point between the cutting edge of the corner R and the outer peripheral cutting edge is a portion in which two cutting edges having different shapes are connected to each other, the axial rake angle changes at the front end side and the base end side in the rotation center axis direction with the boundary point interposed therebetween.

Specifically, when the axial rake angle of the cutting edge of the corner R at the boundary point decreases with respect to the twist angle of the outer peripheral cutting edge (corresponding to the axial rake angle), the cutting edge in the vicinity of the boundary point is formed in a convex shape which protrudes in the tool rotation direction. Further, when the axial rake angle of the cutting edge of the corner R at the boundary point increases with respect to the twist angle of the outer peripheral cutting edge, the cutting edge in the vicinity of the boundary point is formed in a concave shape which is recessed in the direction opposite to the tool rotation direction.

According to the indexable rotary cutting tool, since the axial rake angle of the cutting edge of the corner R at the boundary point is set to be equal to or larger than 90% and equal to or smaller than 110% in a state where the size of the twist angle of the outer peripheral cutting edge is 100%, it is possible to prevent the cutting edge in the vicinity of the boundary point from being formed in a convex shape or a concave shape and to smoothly connect the outer peripheral cutting edge and the cutting edge of the corner R to each other. Accordingly, it is possible to prevent a large cutting load from being applied to the vicinity of the boundary point.

Further, in the indexable rotary cutting tool, the radial rake angle may have a maximum value in a region located between the reference point and the boundary point between the outer peripheral cutting edge and the cutting edge of the corner R in the cutting edge of the corner R.

A region (an intermediate portion) located between the boundary point with respect to the outer peripheral cutting edge of which the axial rake angle is set to a positive value in the cutting edge of the corner R and the reference point of which the axial rake angle is set to a negative value includes a portion (the rotationally most projecting point) which protrudes furthest in the tool rotation direction and corresponds to a position in which the workpiece starts to be bitten.

When the radial rake angle in the above-described region is set to a maximum value (the largest to the positive angle side) in the cutting edge of the corner R, the sharpness of this area is increased. That is, since the biting to the workpiece is satisfactory, the chattering vibration is prevented and the work surface accuracy is improved.

Specifically, for example, when the radial rake angle (the true rake angle) of the reference point close to the boundary point between the cutting edge of the corner R and the bottom cutting edge is indicated by a, the radial rake angle (the true rake angle) at the boundary point between the cutting edge of the corner R and the outer peripheral cutting edge is indicated by β, and the maximum value of the radial rake angle (the true rake angle) in the above-described region (the intermediate portion) is indicated by γ, all of the radial rake angle α, the radial rake angle β, and the radial rake angle γ have negative values. Then, when the absolute values α, β, and γ of the radial rake angle are respectively indicated by $|α⊕|$, $|β|$, and $|γ|$, a relationship of $|α|>|β|>|γ|$ is established.

Advantageous Effects of Invention

According to an indexable rotary cutting tool and an insert of the present invention, it is possible to stably perform a high-accuracy cutting process with high efficiency for a long period of time by preventing chattering vibration or bending or chipping even when a cutting process is performed on a workpiece formed of a high-toughness metal material or a high-hardness material while a tool protrusion length is long (for example, L/D is 4 or more).

DESCRIPTION OF EMBODIMENTS

Figure 1:
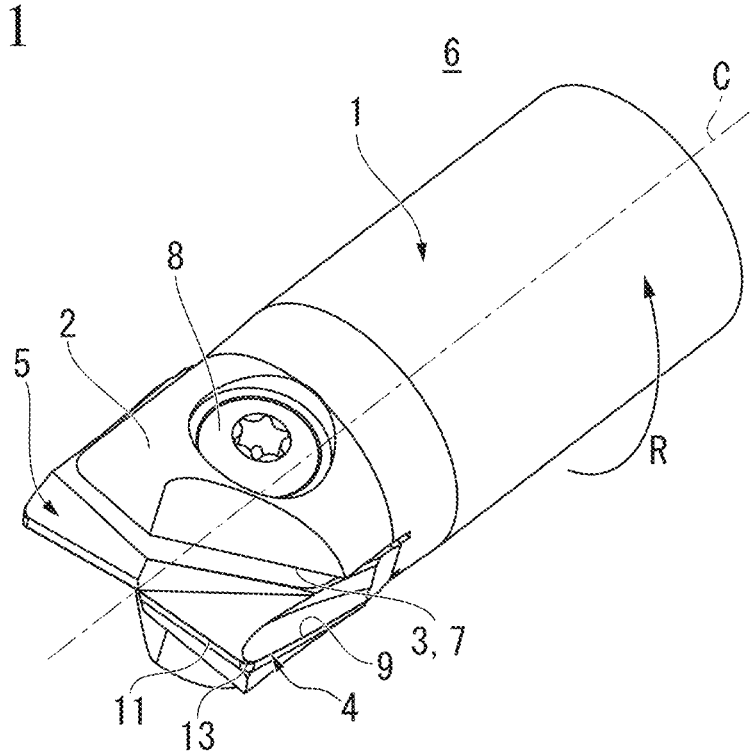
FIG. 1 is a perspective view showing an indexable rotary cutting tool according to an embodiment of the present invention.
Figure 2:
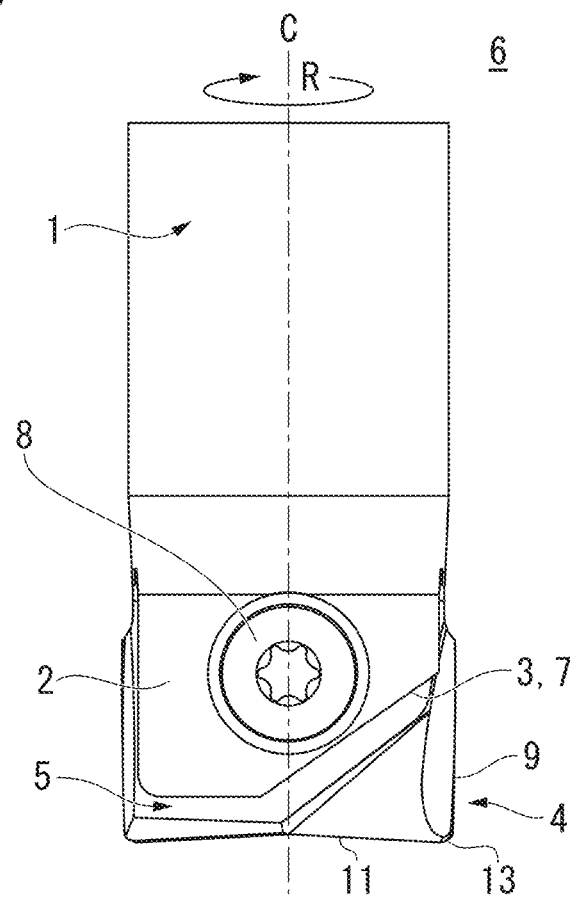
FIG. 2 is a plan view of the indexable rotary cutting tool.

Hereinafter, an indexable rotary cutting tool according to an embodiment of the present invention will be described with reference to the drawings. The indexable rotary cutting tool of the embodiment is an indexable radius end mill 6. The indexable radius end mill 6 is particularly suitable for a face milling process (planar process) and a side finishing process performed on a workpiece in a cutting condition in which a tool protruding length is long (L/D is 4 or more). Additionally, the value L indicates the length of the tool in the direction of the rotation center axis C and the value D indicates the diameter of the rotation locus of the tool cutting edge.

(Schematic Configuration of Indexable Radius End Mill)

As shown in FIGS. 1 to 4, the indexable radius end mill 6 includes a tool main body 1 which is formed in a substantially columnar shape and an insert 5 which is detachably mounted on a mounting seat 3 formed at a tip end portion 2 of the tool main body 1 in the direction of the rotation center axis C and includes a cutting edge portion 4.

A shank portion (not shown) and the tool main body 1 are integrally formed with each other at the base end part of the tool main body 1 in the direction of the rotation center axis C.

The indexable radius end mill 6 of the embodiment includes the tool main body 1 which is formed of steel or cemented carbide and the insert 5 which is formed of cemented carbide and the insert 5 having a plate shape is detachably mounted on the mounting seat (the insert mounting seat) 3 formed at the tip end portion 2 of the tool main body 1 rotated about the rotation center axis C so that the insert center axis (the symmetric axis of the cutting edge portion 4 formed on the insert 5) is aligned with the rotation center axis C of the tool.

The insert 5 which is mounted on the mounting seat 3 is disposed so that the cutting edge portion 4 protrudes toward the front end of the tool main body 1 and outward in the radial direction.

In the indexable radius end mill 6, the base end part (the shank portion) of the tool main body 1 is indirectly or directly attached to a spindle (not shown) of a machining tool through a chuck and the indexable radius end mill is rotated in the tool rotation direction R about the rotation center axis C with the rotational driving of the spindle so that milling is performed on a workpiece formed of a metal material or the like.

(Definition of Directions Used in Embodiment)

In the embodiment, the extension direction of the rotation center axis C of the tool main body 1, that is, the direction parallel to the rotation center axis C will be referred to as the direction of the rotation center axis C. Also, the direction from the shank portion of the tool body 1 toward the mounting seat 3 in the rotation center axis C direction is referred to as toward a tip end side (lower side in FIGS. 2 and 3), and the direction from the mounting seat 3 to the shank portion is referred to as toward a base end side (upper side in FIGS. 2 and 3).

Further, a direction orthogonal to the rotation center axis C will be referred to as the radial direction. In the radial direction, a direction of moving toward the rotation center axis C will be referred to as inward in the radial direction and a direction moving away from the rotation center axis C will be referred to as outward in the radial direction.

Further, a direction rotating about the rotation center axis C will be referred to as the circumferential direction. In the circumferential direction, a direction in which the tool main body 1 is rotated with the rotational driving of the spindle during cutting will be referred to as the tool rotation direction R and the rotation direction opposite thereto will be referred to as toward the side opposite to the tool rotation direction R (that is, the counter tool rotation direction).

Figure 7:
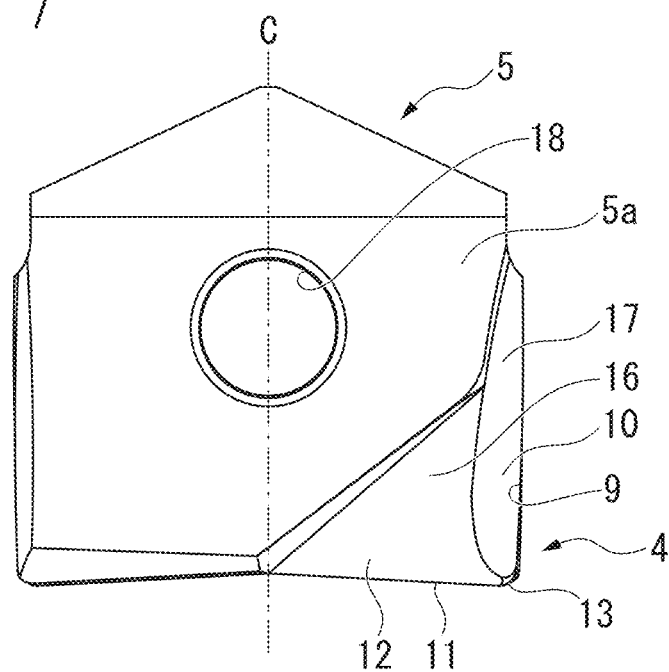
FIG. 7 is a plan view of the insert.
Figure 8:
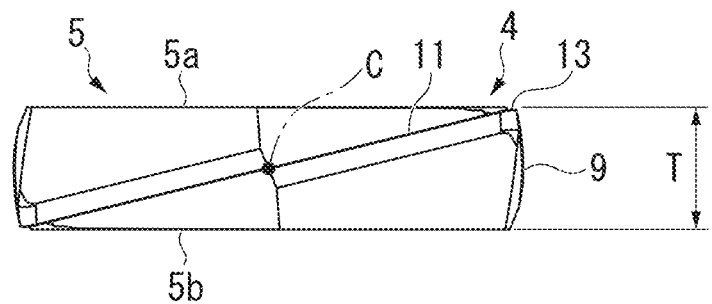
FIG. 8 is a plan view of the insert.
Figure 9:
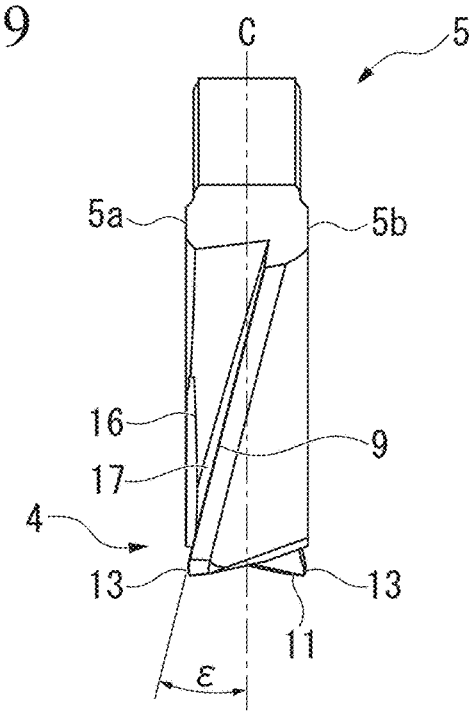
FIG. 9 is a side view of the insert.

Additionally, the definition of the above-described directions is applied to the entire indexable radius end mill 6 and is also applied to the insert 5 of which the insert center axis is aligned with (is disposed to be coaxial to) the rotation center axis C of the indexable radius end mill 6 in the same way. Thus, in FIGS. 7 to 9 showing the insert 5, the insert center axis will be denoted by using reference sign C which is the same as that of the rotation center axis C.

(Mounting Seat)

In FIGS. 1 to 4, in the mounting seat 3, the tip end portion 2 of the tool main body 1 is provided with a insert fit groove in a slit shape 7 which extends in the radial direction by including the rotation center axis C of the tool and a clamp screw 8 configure to fix the insert 5 inserted into the insert fit groove 7.

The insert fit groove 7 opens on the front end face of the tool main body 1 and extends in the radial direction of the tool main body 1 to also open on the outer peripheral surface of the tool main body 1. The insert fit groove 7 is formed in a slit shape which is formed with a predetermined length (depth) from the front end face of the tool main body 1 to the base end face thereof.

Since the slit-shaped insert fit groove 7 is formed at the tip end portion 2 of the tool main body 1, the tip end portion 2 of the tool main body 1 is divided into two parts so that a pair of front end half portions are formed. Further, an insert clamp screw hole is formed in the tip end portion 2 to extend from one surface portion of the front end half portion to the inside of the other front end half portion while intersecting the insert fit groove 7. The screw center axis of the insert clamp screw hole extends in a direction orthogonal to a direction in which the insert fit groove 7 of the tip end portion 2 extends in the radial direction of the tool main body 1.

Further, a female screw portion which is screw-connected to a male screw portion of the clamp screw 8 is formed on the inner peripheral surface of the insert clamp screw hole which extends from one front end half portion to the inside of the other front end half portion.

(Insert)

The insert 5 is formed in a substantially plate shape as shown in FIGS. 5 to 9 and has a thickness T as shown in FIG. 8. The insert 5 includes a screw insertion hole 18 into which the clamp screw 8 for fixing the insert 5 to the mounting seat 3 is inserted and the cutting edge portion 4 which cuts into a workpiece to perform a cutting process.

The insert 5 includes a pair of outer surface portions 5a and 5b which face in the thickness direction. The screw insertion hole 18 is a through-hole through which the clamp screw is inserted from one outer surface 5a toward the other outer surface portion 5b. The clamp screw 8 is inserted through the screw insertion hole 18 at the time of mounting and fixing the insert 5 to the mounting seat 3.

The cutting edge portion 4 includes a rake face which faces the tool rotation direction R, a flank face which intersects the rake face and faces the outside in the radial direction and the front end side, and a cutting edge which is formed at an intersection ridgeline between the rake face and the flank face.

The cutting edge includes an outer peripheral cutting edge 9, a bottom cutting edge 11, and a cutting edge 13 of the corner R. The cutting edge is formed in a substantially L-shape on the whole by including the outer peripheral cutting edge 9, the bottom cutting edge 11, and the cutting edge 13 of the corner R. Further, the rake face and the flank face are adjacently disposed in each cutting edge (9, 11, and 13).

The insert 5 of the embodiment is a two-edge cutting insert and includes two sets of cutting edges each including the outer peripheral cutting edge 9, the bottom cutting edge 11, and the cutting edge 13 of the corner R and the two sets of cutting edges are disposed at 180° rotational symmetric positions about the rotation center axis C.

(Outer Peripheral Cutting Edge)

Reference Sign "9" shown in the drawings indicates the outer peripheral cutting edge 9 of the insert 5. The outer peripheral cutting edge 9 extends along the direction of the rotation center axis C. Specifically, the outer peripheral cutting edge 9 extends to be helically twisted in a direction opposite to the tool rotation direction R as it goes from the front end connected to the cutting edge 13 of the corner R toward the base end side.

Figure 3:
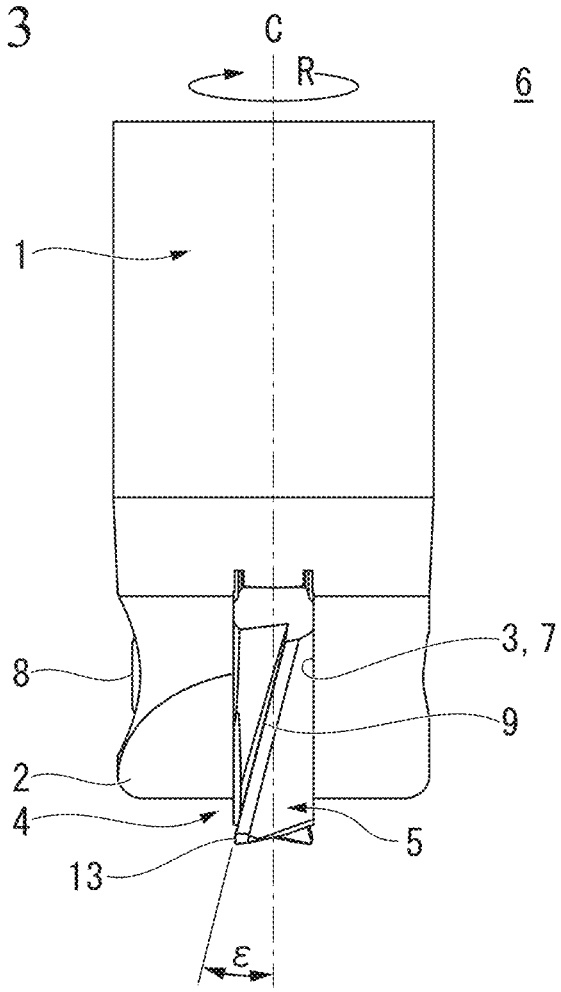
FIG. 3 is a side view of the indexable rotary cutting tool.
Figure 4:
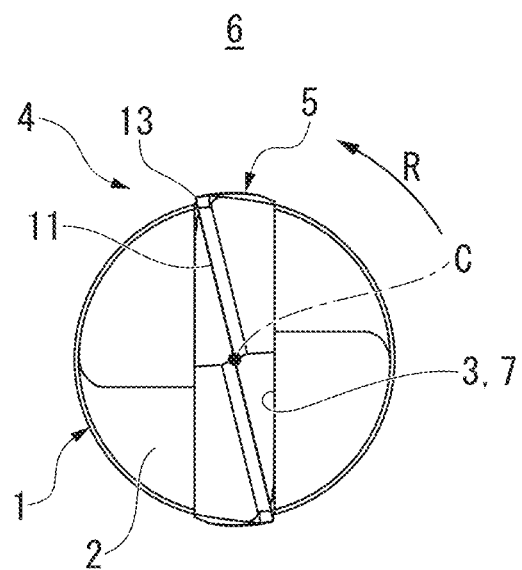
FIG. 4 is a front view of the indexable rotary cutting tool.

That is, as shown in FIGS. 3 and 9, the twist angle (corresponding to the axial rake angle) ε of the outer peripheral cutting edge 9 is set to a positive value (a positive angle). Further, in the example of the embodiment, the radial rake angle (the central rake angle and the radial rake) of the outer peripheral cutting edge 9 is set to a positive value except for a portion corresponding to the chamfered surface 15 to be described. However, the present invention is not limited thereto and the radial rake angle of the outer peripheral cutting edge 9 may be 0° or a negative value.

When the insert 5 is mounted on the mounting seat 3 and the indexable radius end mill 6 is rotated about the rotation center axis C, the rotation locus of the pair of outer peripheral cutting edges 9 are formed in a cylindrical shape.

When the insert 5 is mounted on the mounting seat 3 (the insert fit groove 7) of the tool main body 1, a boundary point Q between the outer peripheral cutting edge 9 and the cutting edge 13 of the corner R and the outer peripheral cutting edge 9 are located at the outermost periphery in a direction (that is, the radial direction) perpendicular to the rotation center axis C.

Figure 10:
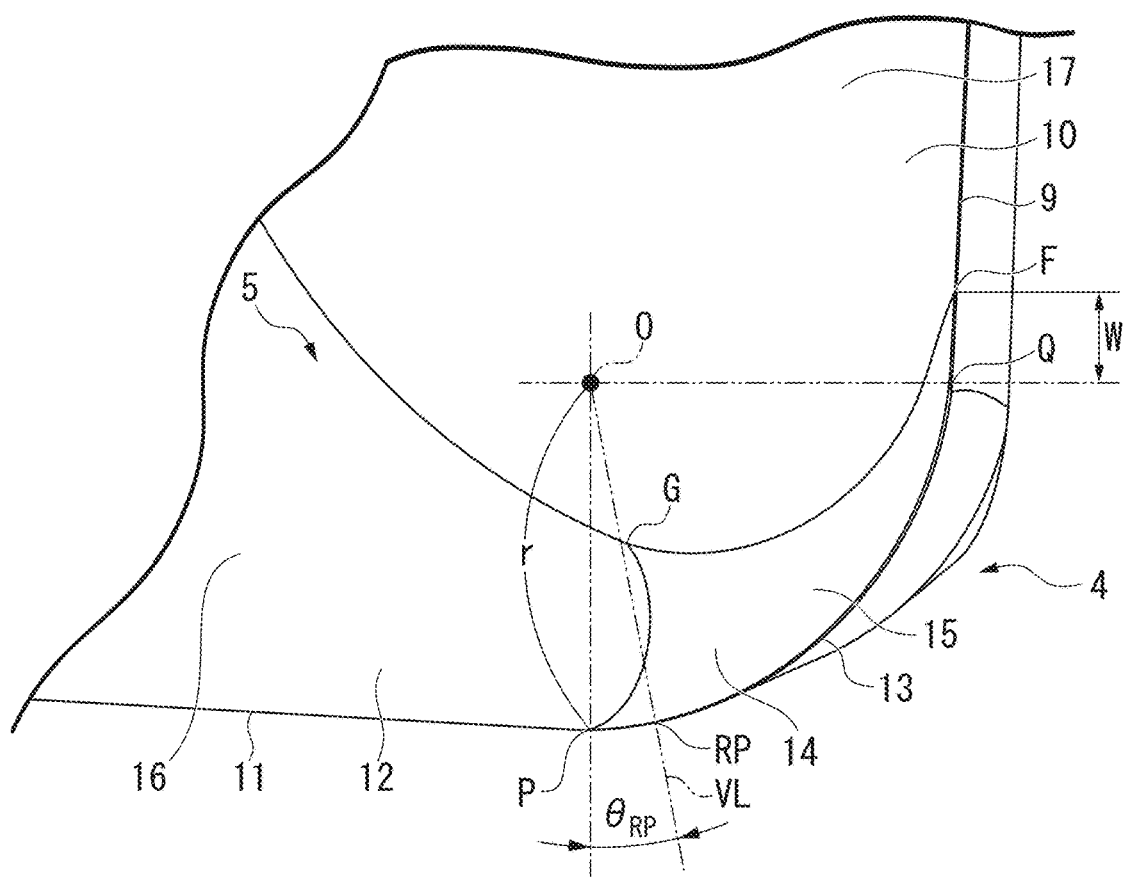
FIG. 10 is an enlarged view of a main part of FIG. 7.
Figure 12:
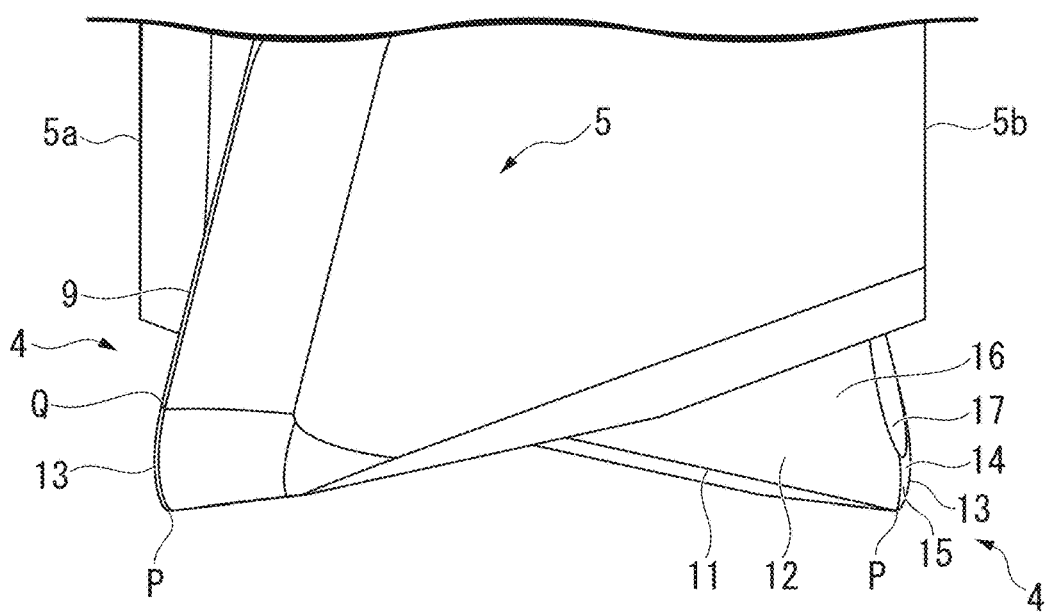
FIG. 12 is an enlarged view of a main part of FIG. 9.
Figure 13:
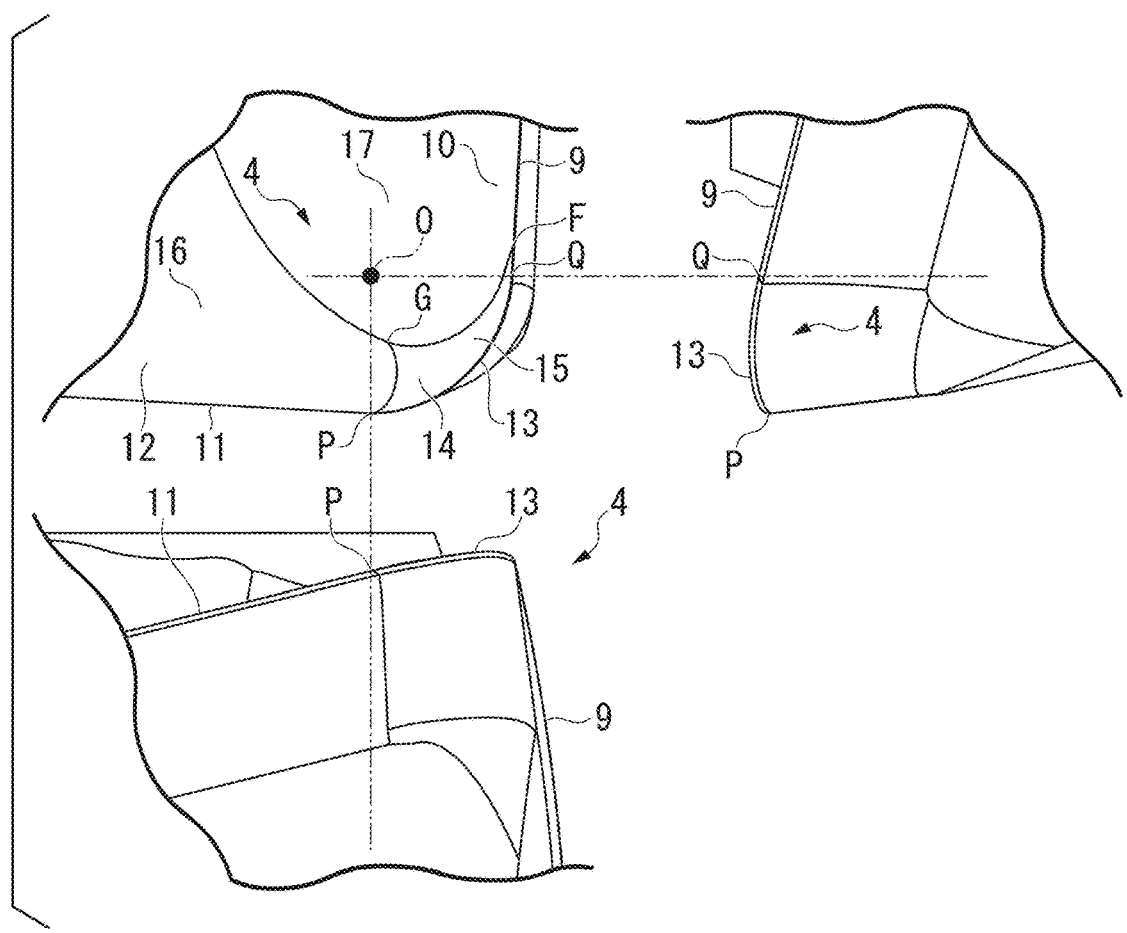
FIG. 13 is an enlarged view in the vicinity of a cutting edge of a corner R.

As shown in FIGS. 10, 12, and 13, the front end of the outer peripheral cutting edge 9 and the base end of the cutting edge 13 of the corner R are connected at the boundary point Q. That is, the cutting edge which faces the base end side from the boundary point Q is the outer peripheral cutting edge 9 and the cutting edge which faces the front end side from the boundary point Q is the cutting edge 13 of the corner R.

As shown in FIGS. 7, 10, and 13, a rake face 10 of the outer peripheral cutting edge 9 is adjacently disposed at the inside of the outer peripheral cutting edge 9 in the radial direction. A chip removal groove 17 is formed at the inside of the rake face 10 of the outer peripheral cutting edge 9 in the radial direction. The chip removal groove 17 extends along the direction of the rotation center axis C.

Specifically, the outer peripheral cutting edge 9 is located at the outer edge of the chip removal groove 17 in the radial direction and the rake face 10 extending along the outer peripheral cutting edge 9 is formed at a portion adjacent to the outer peripheral cutting edge 9 in the chip removal groove 17.

On the side in the direction opposite to the tool rotating direction R of the peripheral cutting edge 9, the flank face is disposed adjacent to the peripheral cutting edge 9 facing in the tool rotating direction R. The flank face is formed outward in the radial direction and is inclined to face inward in the radial direction as it goes from the outer peripheral cutting edge 9 in the direction opposite to the tool rotation direction R so that a flank angle is set.

(Bottom Cutting Edge)

Reference Sign "11" shown in the drawings indicates the bottom cutting edge 11 of the insert 5. The bottom cutting edge 11 extends along the radial direction. Specifically, the bottom cutting edge 11 extends toward the base end side as it goes inward in the radial direction from the outer radial end connected to (adjacent to) the cutting edge 13 of the corner R and is slightly inclined with respect to a plane (a horizontal plane) perpendicular to the rotation center axis C.

Figure 11:
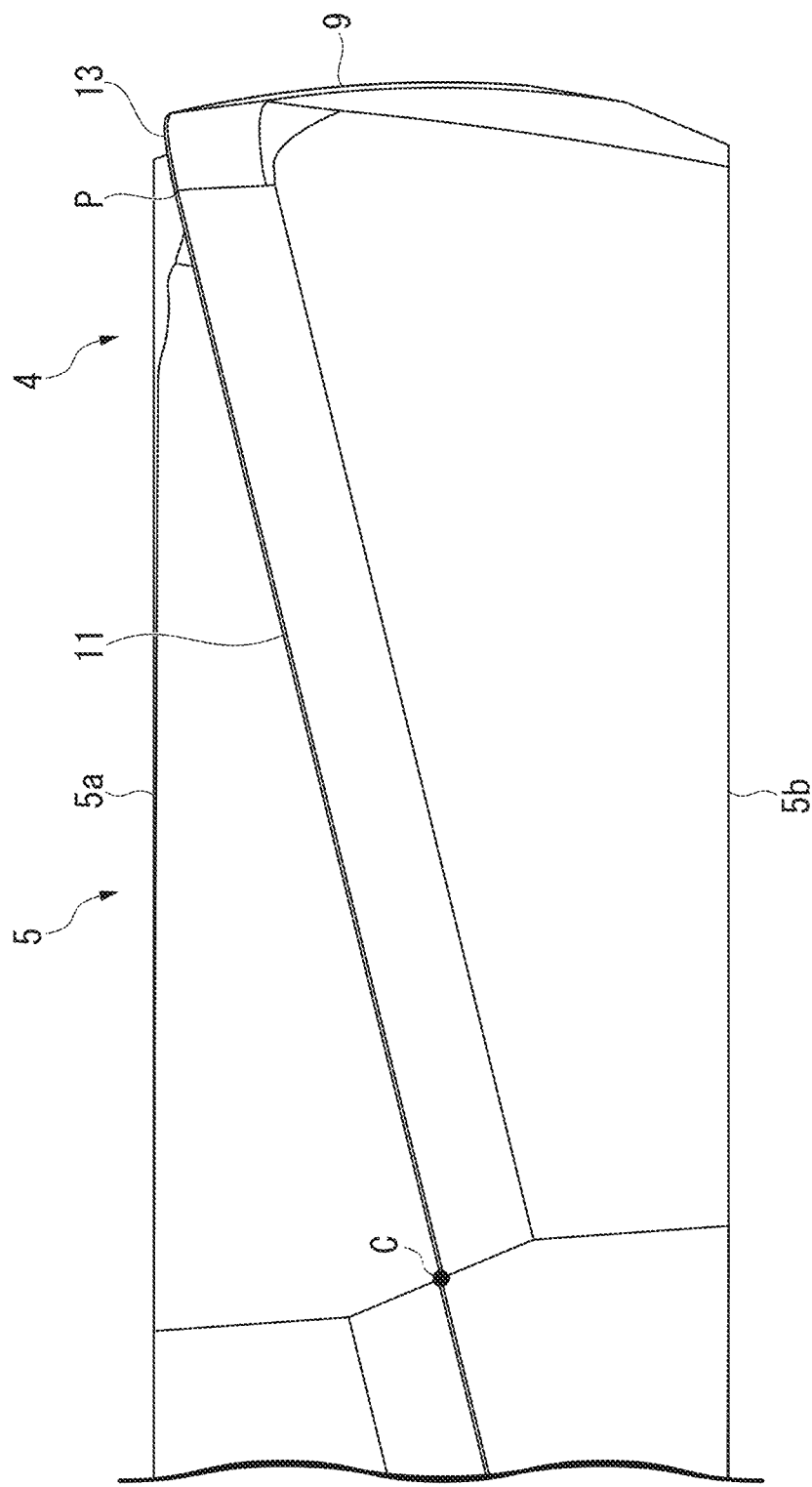
FIG. 11 is an enlarged view of a main part of FIG. 8.

In the example of the embodiment, the axial rake angle (the axial rake) of the bottom cutting edge 11 is set to 0°. However, the present invention is not limited thereto and the axial rake angle of the bottom cutting edge 11 may be a negative value or a positive value. Further, as shown in FIG. 11, the radial rake angle of the bottom cutting edge 11 is set to 0°. However, the present invention is not limited thereto and the radial rake angle of the connection portion may be set to a negative value or a positive value by extending, for example, the connection portion with respect to the cutting edge 13 of the corner R in the bottom cutting edge 11 in a direction different from that of the other portion.

When the insert 5 is mounted on the mounting seat 3 and the indexable radius end mill 6 is rotated about the rotation center axis C, the rotation locus of the pair of bottom cutting edges 11 are formed in a substantially conical shape.

When the insert 5 is mounted on the mounting seat 3 (the insert fit groove 7) of the tool main body 1, the boundary point P between the cutting edge 13 of the corner R and the bottom cutting edge 11 is located at the frontmost end in the direction of the rotation center axis C.

As shown in FIGS. 10, 11, and 13, the outer end of the bottom cutting edge 11 in the radial direction and the inner end of the cutting edge 13 of the corner R in the radial direction are connected at the boundary point P. That is, the cutting edge which faces the inside in the radial direction from the boundary point P is the bottom cutting edge 11 and the cutting edge which faces the outside in the radial direction from the boundary point P is the cutting edge 13 of the corner R.

As shown in FIGS. 7, 10, and 13, a rake face 12 of the bottom cutting edge 11 facing the tool rotation direction R is adjacently disposed at the base end side of the bottom cutting edge 11. A chip removal groove 16 is formed on the base end side of the rake face 12 of the bottom cutting edge 11. The chip removal groove 16 extends along the direction of the rotation center axis C.

Specifically, the bottom cutting edge 11 is located at the edge of the front end side of the chip removal groove 16 and the rake face 12 extending along the bottom cutting edge 11 is formed at a portion adjacent to the bottom cutting edge 11 in the chip removal groove 16.

The chip removal groove 16 of the bottom cutting edge 11 is adjacently disposed at the inside of the chip removal groove 17 of the outer peripheral cutting edge 9 in the radial direction and the chip removal grooves 16 and 17 are formed by different surfaces. In the example of the embodiment, the chip removal groove 17 which is adjacent to the outer peripheral cutting edge 9 is formed in a concave curved surface shape and the chip removal groove 16 which is adjacent to the bottom cutting edge 11 is formed in a plane shape.

The flank face of the bottom cutting edge 11 is adjacently disposed at the opposite side to the bottom cutting edge 11 in the tool rotation direction R. The flank face is formed toward the front end side and is inclined as it goes from the bottom cutting edge 11 toward the opposite side to the tool rotation direction R so that a flank angle is set.

(Cutting Edge of Corner R)

Reference Sign "13" shown in the drawings indicates the cutting edge 13 of the corner R which connects the bottom cutting edge 11 of the insert 5 to the outer peripheral cutting edge 9. As shown in FIGS. 10 and 13, the cutting edge 13 of the corner R is formed to connect the outer end of the bottom cutting edge 11 in the radial direction to the front end of the outer peripheral cutting edge 9 and is formed in an arc shape which protrudes toward the outer peripheral side of the front end of the tool main body 1.

When the insert 5 is mounted on the mounting seat 3 and the indexable radius end mill 6 is rotated about the rotation center axis C, the rotation locus of the pair of cutting edges 13 of the corner R (a cross-sectional shape including the rotation center axis C of the rotation locus and parallel to the direction of the rotation center axis C) are formed in a cylindrical shape which gradually decreases in diameter toward the front end side and the cross-section thereof is formed in a quarter arc shape.

When the insert 5 is mounted on the mounting seat 3 (the insert fit groove 7) of the tool main body 1, the cutting edge 13 of the corner R becomes an arc edge connected from the lowest point (the boundary point P) located at the outer end of the bottom cutting edge 11 in the radial direction to the outermost peripheral point (the boundary point Q) of the tool located at the front end of the outer peripheral cutting edge 9.

The rake face 14 of the cutting edge 13 of the corner R facing the tool rotation direction R is adjacently disposed at the inside of the cutting edge 13 of the corner R in the radial direction and the base end side thereof. In the example of the embodiment, the rake face 14 of the cutting edge 13 of the corner R is formed by the chamfered surface 15 which is one flat or curved surface. The chamfered surface 15 is formed in at least the rake face 14 of the cutting edge 13 of the corner R among the rake face 10 of the outer peripheral cutting edge 9, the rake face 12 of the bottom cutting edge 11, and the rake face 14 of the cutting edge 13 of the corner R. The chamfered surface 15 will be separately described later.

The chip removal groove 17 is connected to the base end side of the rake face 14 of the cutting edge 13 of the corner R and the chip removal grooves 16 and 17 are connected at the inside of the rake face 14 of the cutting edge 13 of the corner R in the radial direction.

The flank face of the cutting edge 13 of the corner R is adjacently disposed at the opposite side to the cutting edge 13 of the corner R in the tool rotation direction R. The flank face is formed in a curved surface shape which protrudes toward the outer peripheral side of the front end of the tool main body 1 and is formed toward the outside in the radial direction and the front end side. The flank face is inclined toward the inside in the radial direction and the base end side as it goes toward the opposite side to the tool rotation direction R from the cutting edge 13 of the corner R so that a flank angle is set.

Figure 16:
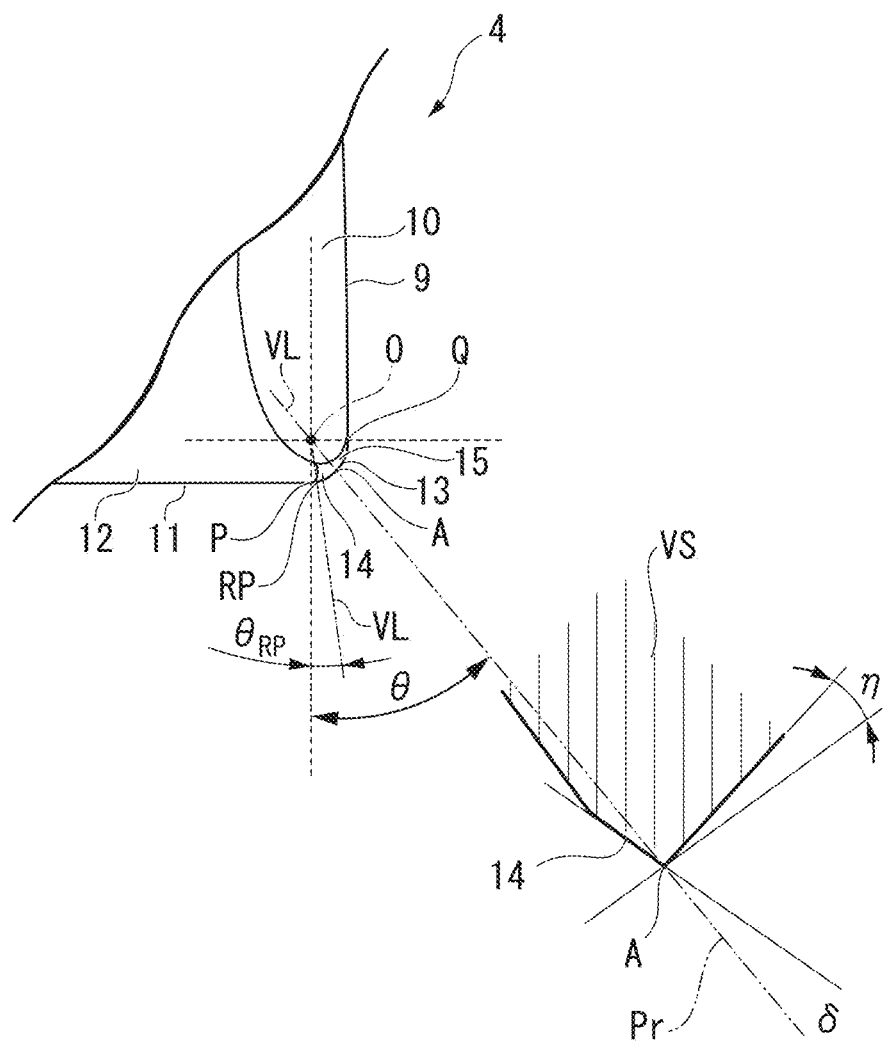
FIG. 16 is a diagram showing a radial rake angle and a radial angle of the cutting edge of the corner R of the indexable rotary cutting tool.

Here, the "radial rake angle $\delta$", the "radial angle $\theta$", and the "reference point RP" will be defined in advance with reference to FIG. 16 in order to describe the particular technical features of the embodiment.

Reference Sign "Pr" shown in FIG. 16 indicates a reference plane perpendicular to the primary tool movement direction (the tool rotation direction R) of the indexable radius end mill 6. The reference plane Pr is a virtual plane including the rotation center axis C and in the embodiment, as shown in FIG. 16, a predetermined point A on the cutting edge 13 of the corner R is included in the plane. Further, the left upper diagram of FIG. 16 is an enlarged view in the vicinity of the cutting edge portion of the corner R of the insert as viewed from a plane perpendicular to the reference plane Pr.

The Reference Sign "O" indicates the arc center point of the cutting edge 13 of the corner R.

The Reference Sign "VL" indicates a virtual straight line passing through the arc center point O of the cutting edge 13 of the corner R and the predetermined point A on the cutting edge 13 of the corner R.

A cross-section (hatched surface) of the insert 5 indicated by Reference Sign "VS" is a virtual plane which is perpendicular to the reference plane Pr and includes the virtual straight line VL.

Reference Sign "$\delta$" indicates a radial rake angle corresponding to an angle (an angle formed between the virtual straight line VL and the rake face 14) in which the rake face 14 of the cutting edge 13 of the corner R is inclined with respect to the reference plane Pr inside the virtual plane VS. The radial rake angle $\delta$ is a true rake angle. In the embodiment, the radial rake angle $\delta$ changes when the predetermined point A on the cutting edge 13 of the corner R moves on the cutting edge 13 of the corner R. In other words, the radial rake angle ($\delta$) becomes different according to the position of the point A on the cutting edge 13 of the corner R.

Reference Sign "$\eta$" indicates a flank angle at the predetermined point A on the cutting edge 13 of the corner R, in other words, an angle formed by the flank face of the cutting edge 13 of the corner R and the straight line orthogonal to the virtual straight line VL in the virtual plane VS.

Reference Sign "$\theta$" indicates a radial angle which is an angle in which the virtual straight line VL is inclined with respect to the rotation center axis C. Specifically, the radial angle $\theta$ indicates an angle in which the virtual straight line VL (that is, the virtual straight line VL in FIG. 16) projected to the reference plane Pr is inclined with respect to the rotation center axis C inside the reference plane Pr. In addition, the "virtual straight line VL projected to the reference plane Pr" indicates a state where the virtual straight line VL is projected in a direction perpendicular to the reference plane Pr.

Reference Sign "RP" indicates a point in which the virtual straight line VL of which the radial angle $\theta$ is set to a predetermined value (a radial angle $\theta_{RP}$) intersects the cutting edge 13 of the corner R. In the embodiment, the intersection point at the radial angle $\theta_{RP}$ of 5° will be referred to as a reference point RP.

Figure 14:
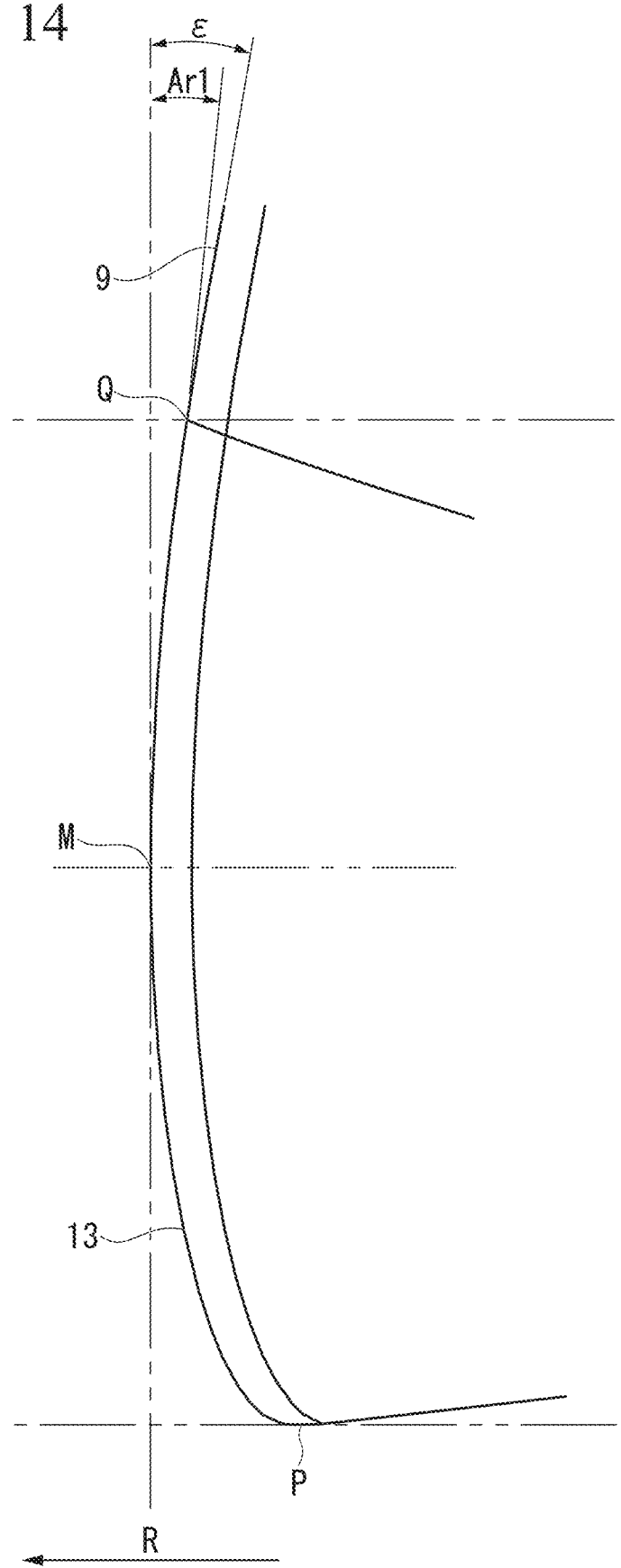
FIG. 14 is a side view showing a rotationally most projecting point of the cutting edge of the corner R.

Then, as shown in FIGS. 12 and 14, an axial rake angle Ar1 of the cutting edge 13 of the corner R at the boundary point Q between the cutting edge 13 of the corner R and the outer peripheral cutting edge 9 has a positive value.

Further, in FIGS. 10 and 16, an axial rake angle Ar2 (not shown) of the cutting edge 13 of the corner R at the reference point RP has a negative value. Further, in the example of the embodiment, the axial rake angle of the cutting edge 13 of the corner R at the boundary point P between the cutting edge 13 of the corner R and the bottom cutting edge 11 also has a very small negative value.

Figure 17:
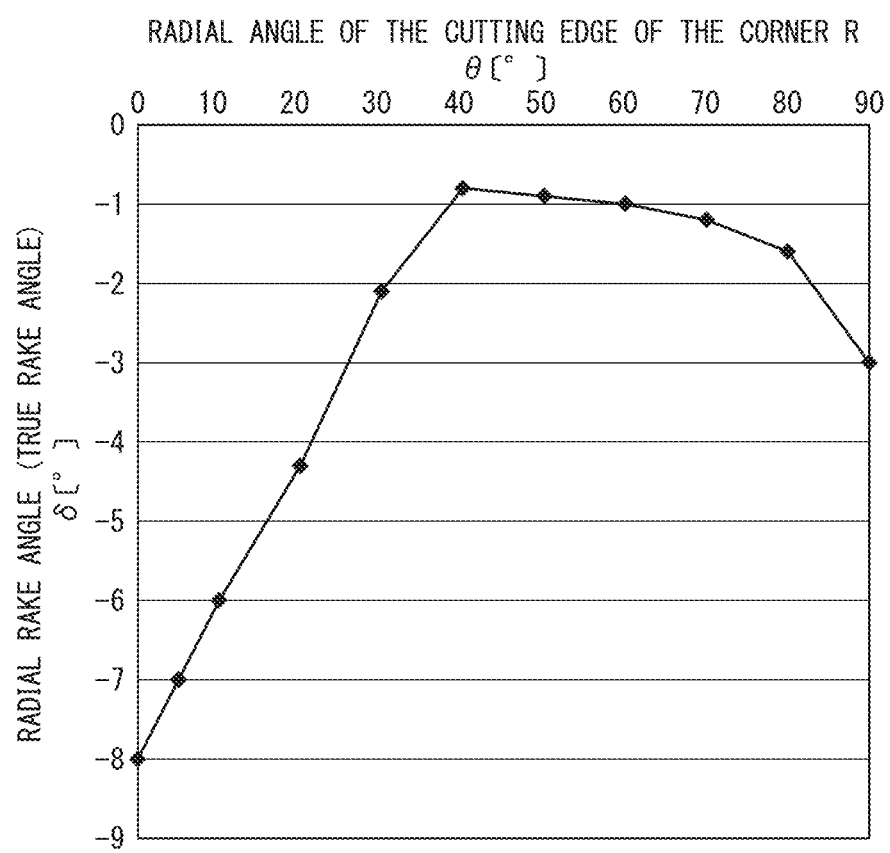
FIG. 17 is a graph showing a profile of the radial rake angle of the cutting edge of the corner R of the indexable rotary cutting tool.

As shown in FIG. 17, the radial rake angle $\delta$ of the cutting edge 13 of the corner R has a negative value in at least a region between the boundary point Q and the reference point RP in the entire edge length region of the cutting edge 13 of the corner R (a range in which the radial angle $\theta$ is 0 to 90°). In the example of the embodiment, the radial rake angle $\delta$ has a negative value in the entire edge length region of the cutting edge 13 of the corner R. That is, the radial rake angle $\delta$ in the entire region between both ends (the boundary points Q and P) of the cutting edge 13 of the corner R is a negative angle.

Further, the radial rake angle $\delta$ of the cutting edge 13 of the corner R at the reference point RP is set to be smaller than the radial rake angle $\delta$ of the cutting edge 13 of the corner R at the boundary point Q. Further, in the example of the embodiment, the radial rake angle $\delta$ of the cutting edge 13 of the corner R at the boundary point P between the cutting edge 13 of the corner R and the bottom cutting edge 11 is set to be smaller than the radial rake angle $\delta$ of the cutting edge 13 of the corner R at the boundary point Q between the cutting edge 13 of the corner R and the outer peripheral cutting edge 9.

Specifically, in the embodiment, in FIG. 17, the radial rake angle δ is set to −8° at the boundary point P (θ=0°), is set to −7° at the reference point RP (θ=5°), and is set to −3° at the boundary point Q (θ=90°). That is, the radial rake angle δ at the boundary point P and the reference point RP adjacent to the bottom cutting edge 11 in the cutting edge 13 of the corner R is set to be a negative angle twice or more larger than the radial rake angle δ at the boundary point Q adjacent to the outer peripheral cutting edge 9 in the cutting edge 13 of the corner R.

The radial rake angle δ is set to a maximum value at the boundary point P in the cutting edge 13 of the corner R. Further, the radial rake angle δ is set to a maximum value in a region (an intermediate portion) located between the boundary point Q and the reference point RP in the cutting edge 13 of the corner R. Additionally, the intermediate portion indicates a region (0°<θ<90°) excluding the boundary point Q and the reference point RP in the cutting edge 13 of the corner R.

In the example shown in FIG. 17, the maximum value of the radial rake angle δ is set to a range of a radial angle θ of 30° to 50° in the cutting edge 13 of the corner R. In other words, a point in which the radial rake angle δ becomes the maximum value is located in a region in which the radial angle θ equals to or more than 30° and is equal to or smaller than 50° in the cutting edge 13 of the corner R. Specifically, the radial rake angle δ becomes the maximum value (−0.8°) when the radial angle θ is about 40°.

Specifically, for example, when the radial rake angle of the reference point RP close to the boundary point P between the cutting edge 13 of the corner R and the bottom cutting edge 11 is indicated by α, the radial rake angle at the boundary point Q between the cutting edge 13 of the corner R and the outer peripheral cutting edge 9 is indicated by β, and the maximum value of the radial rake angle in the above-described region (the intermediate portion) is indicated by γ, all of the radial rake angle α, the radial rake angle and the radial rake angle γ have negative values. Then, when the absolute values α, and γ of the radial rake angles are respectively indicated by |α|, |β|, and |γ|, a relationship of |α|>|β|>|γ| is established.

As shown in FIG. 14, the rotationally most projecting point M which protrudes furthest in the tool rotation direction R is disposed on the cutting edge 13 of the corner R in the cutting edge 13 of the corner R and the outer peripheral cutting edge 9. Since the rotationally most projecting point M is located on the cutting edge 13 of the corner R, an arc shape which protrudes in the tool rotation direction R is formed.

Figure 15:
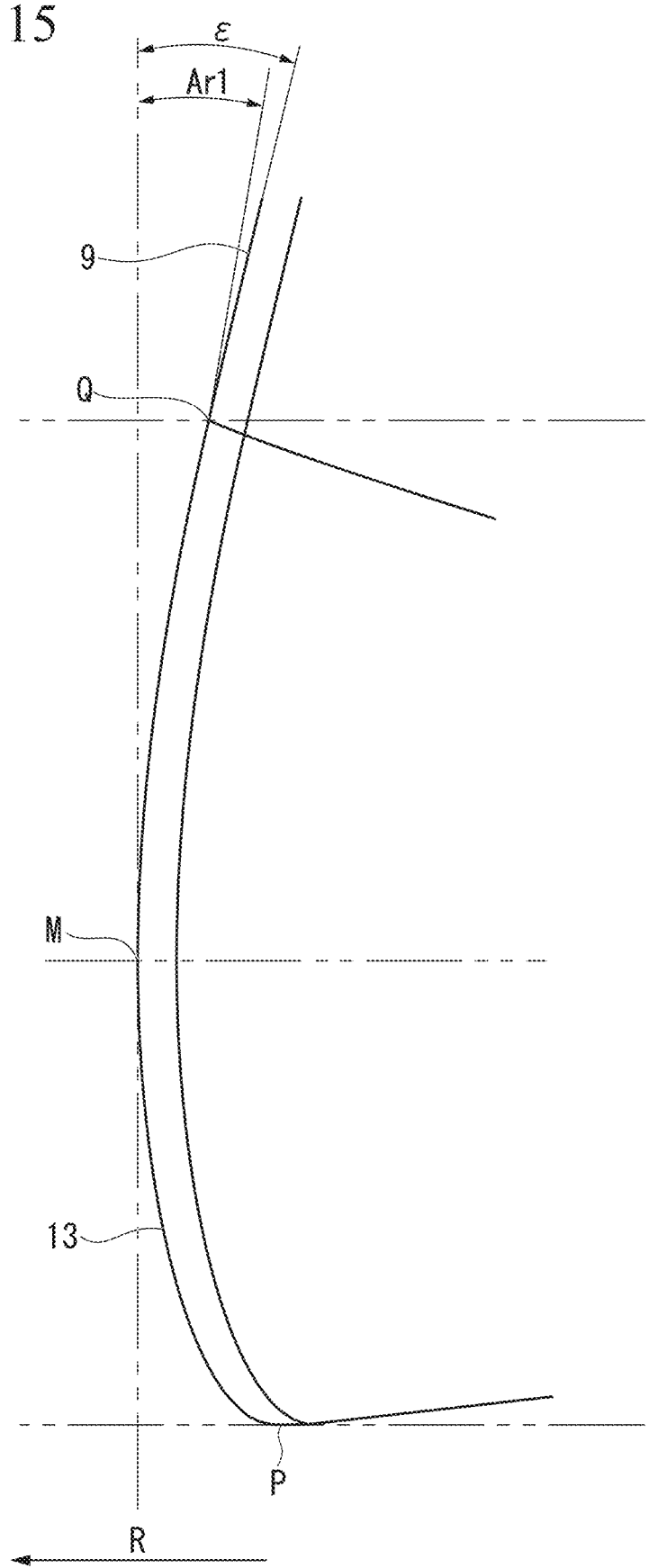
FIG. 15 is a side view showing a modified example of the cutting edge of the corner R.

An example shown in FIG. 15 is a modified example of the cutting edge 13 of the corner R of the embodiment. In this modified example, the rotationally most projecting point M is disposed in a range of a radial angle θ of 40° to 55° on the cutting edge 13 of the corner R. Specifically, in the example shown in the drawings, the rotationally most projecting point M is 53° at the radial angle θ.

Further, in the modified example of FIG. 15, the size of the axial rake angle Ar1 of the cutting edge 13 of the corner R at the boundary point Q between the cutting edge 13 of the corner R and the outer peripheral cutting edge 9 is set to be equal to or larger than 90% and equal to or smaller than 110% in a condition that the size of the twist angle ε of the outer peripheral cutting edge 9 is 100%. Specifically, in the modified example, the twist angle ε of the outer peripheral cutting edge 9 is 15° and the axial rake angle Ar1 at the boundary point Q of the cutting edge 13 of the corner R is 14°.

(Chamfered Surface)

As shown in FIGS. 10, 13, and 16, the chamfered surface 15 is disposed adjacent to the cutting edge 13 of the corner R to extend along the cutting edge 13 of the corner R. In the embodiment, the chamfered surface 15 includes the entire edge length region of the cutting edge 13 of the corner R. That is, the chamfered surface 15 is formed in the entire region of the rake face 14 of the cutting edge 13 of the corner R.

Specifically, as shown in FIGS. 10 and 13, when the rake face 14 of the cutting edge 13 of the corner R is viewed from the front side, the chamfered surface 15 is formed in a region surrounded by three curves, that is, a curved ridgeline connecting the boundary point P to the point located between the cutting edge 13 of the corner R and the arc center point O, the cutting edge 13 of the corner R, and the curved ridgeline connecting the point G to the point F disposed adjacent to the cutting edge 13 of the corner R on the outer peripheral cutting edge 9. In the example of the embodiment, the chamfered surface 15 becomes a plane region surrounded by the three curves. Additionally, a total of three surfaces including the pair of chip removal grooves 16 and 17 and the chamfered surface 15 are in contact with one another at the point G.

In the embodiment, the chamfered surface 15 extends beyond the boundary point Q between the cutting edge 13 of the corner R and the outer peripheral cutting edge 9 toward a base end side in the direction of the rotation center axis C from the rake face 14 of the cutting edge 13 of the corner R for the chambered surface 15 to be formed even in the rake face 10 of the outer peripheral cutting edge 9. Specifically, in FIG. 10, the length W in which the chamfered surface 15 extends toward the base end side of the direction of the rotation center axis C from the boundary point Q between the cutting edge 13 of the corner R and the outer peripheral cutting edge 9 equals to or more than 0.02 r and equal to or smaller than 0.5 r when the radius of the cutting edge of the corner R is indicated by r.

In the example shown in the drawings, the width of the chamfered surface 15 gradually narrows from the boundary point P toward the boundary point Q and the point F along the edge length direction of the cutting edge 13 of the corner R.

(Operational Effects of Embodiment)

In the indexable radius end mill 6 and the insert 5 of the above-described embodiment, the twist angle ε of the outer peripheral cutting edge 9 has a positive value and the axial rake angle Ar1 of the cutting edge 13 of the corner R at the boundary point Q (the outermost peripheral position) between the outer peripheral cutting edge 9 and the arc-shaped cutting edge 13 also has a positive value. That is, the twist angle ε of the outer peripheral cutting edge 9 and the axial rake angle Ar1 in the vicinity of the outer peripheral cutting edge 9 at the cutting edge 13 of the corner R have positive angles.

Thus, since chips generated at the time of cutting are efficiently fed from the front end of the tool to the base end side, the chip discharge performance is good. In particular, since it is possible to satisfactorily maintain the chip discharge performance at the time of performing a side finishing process on the upright wall surface of the workpiece (for example, an inner wall surface of a recess to be deeply engraved on a die as a workpiece and generally a wall surface or vertical surface perpendicular to the horizontal plane), it is possible to improve a cutting speed and processing efficiency.

Further, the axial rake angle Ar2 of the cutting edge 13 of the corner R has a negative value at the reference point RP separated from the boundary point P between the cutting edge 13 of the corner R and the bottom cutting edge 11 (the frontmost end position) toward the outer peripheral cutting edge 9 on the cutting edge 13 of the corner R by the radial angle $\theta_{RP}$ of 5°. That is, the axial rake angle Ar2 in the vicinity of the bottom cutting edge 11 of the cutting edge 13 of the corner R is a negative angle.

The vicinity of the bottom cutting edge 11 in the cutting edge 13 of the corner R is a portion cutting into the workpiece at the time of performing a face milling process on a surface of the workpiece (for example, a bottom surface of a recess to be deeply engraved on a die as a workpiece and generally a horizontal plane). That is, in the embodiment, since a portion cutting into the workpiece during the planar process in the cutting edge 13 of the corner R has a negative angle, it is possible to prevent a phenomenon that the front end of the cutting edge is pulled so as to get into the workpiece (the cutting edge being put in the excessively biting state) and to prevent chipping.

Further, when the axial rake angle Ar2 in the vicinity of the bottom cutting edge 11 of the cutting edge 13 of the corner R is set to a negative angle, a reaction force directed toward the base end side in the direction of the rotation center axis C is easily applied from the plane (work surface) of the workpiece to the tool. That is, since a cutting resistance (a compressing force) of compressing the tool in the direction of the rotation center axis C is exerted at all times during a cutting process, it is possible to effectively prevent chattering vibration even in the cutting process in which the tool protruding length is particularly long (for example, L/D is 4 or more) and to improve the work surface accuracy.

Further, as described above, when the axial rake angle Ar1 at the boundary point Q between the cutting edge 13 of the corner R and the outer peripheral cutting edge 9 in the cutting edge 13 of the corner R is set to a positive value and the axial rake angle Ar2 at the reference point RP is set to a negative value, the rotationally most projecting point M of which the axial rake angle changes from a positive value to a negative value is formed at the region (the intermediate portion) located between the boundary point Q and the reference point RP in the cutting edge 13 of the corner R.

The rotationally most projecting point M is disposed to protrude furthest in the tool rotation direction R in the entire edge length region of the cutting edge 13 of the corner R and the outer peripheral cutting edge 9.

The rotationally most projecting point M of the cutting edge 13 of the corner R becomes a portion to be first biting into the workpiece during the cutting process. Since the cutting edge 13 of the corner R is formed in an arc shape, the rotationally most projecting point M disposed on the cutting edge 13 of the corner R is also formed in an arc shape which protrudes in the tool rotation direction R. For this reason, since it is possible to improve the impact resistance at the time of biting even when the rotationally most projecting point M is located at, for example, the cutting edge boundary portion cutting out a work hardened layer of the workpiece, it is possible to secure the cutting edge strength.

Further, the radial rake angle δ in the region from at least the boundary point Q between the cutting edge 13 of the corner R and the outer peripheral cutting edge 9 to the reference point RP in the entire edge length region of the cutting edge 13 of the corner R has a negative value. That is, the radial rake angle δ is set to a negative angle in the substantially entire region of the edge length of the cutting edge 13 of the corner R (a region of 85° or more in the central angle 90° of the cutting edge 13 of the corner R).

Accordingly, since it is possible to secure a large cutting angle of the cutting edge 13 of the corner R in the substantially entire region of the edge length, it is possible to remarkably improve the cutting edge strength. Particularly, when performing a copying process such as contour machining, there is a case in which a locally strong impact is applied to each position of the edge length region of the cutting edge 13 of the corner R. However, also in such a case, it is possible to stably prevent the chipping of the cutting edge.

Further, the radial rake angle δ of the cutting edge 13 of the corner R at the reference point RP is set to be smaller than that of the boundary point Q between the cutting edge 13 of the corner R and the outer peripheral cutting edge 9. That is, since the radial rake angle δ of the reference point RP located in the vicinity of the bottom cutting edge 11 in the cutting edge 13 of the corner R is set to a negative value and a small value, cutting of the cutting edge during the planar process is prevented. Accordingly, an effect of preventing chipping or an effect of preventing a chattering vibration becomes particularly significant.

In particular, even in the case of cutting a metal material (so-called viscous material) with high-toughness, a high-hardness material (for example, a material with Rockwell hardness of 40 HRC or more), or the like as a workpiece, the cutting edge strength is sufficiently secured, the tool life is prolonged, and the quality of the work surface is maintained satisfactorily. Additionally, as such a workpiece, for example, high-performance die steel having high ductility such as DAC-MAGIC (registered trademark) manufactured by Hitachi Metals Co., Ltd. and DH31 manufactured by Daido Steel Co., Ltd. can be exemplified.

Further, the radial rake angle δ of the cutting edge 13 of the corner R at the boundary point Q between the cutting edge 13 of the corner R and the outer peripheral cutting edge 9 can be closer to a positive angle in relation to the reference point RP while having a negative value. Accordingly, since it is possible to secure the sharpness in the vicinity of the outer peripheral cutting edge 9 in the cutting edge 13 of the corner R during a side finishing process, it is possible to improve the biting at the upright wall surface.

Thus, a reaction force (a force separating the tool from the upright wall surface) is not easily applied from the workpiece to the tool during the cutting process. Particularly, even in a cutting tool in which a tool protruding length is long, a reaction force is not easily applied in the tool radial direction. For this reason, it is possible to remarkably prevent the bending of the tool and to improve the work surface accuracy of the upright wall surface.

According to the above-described embodiment, since it is possible to prevent the chattering vibration or bending and to prevent the chipping even when a cutting process is performed on a workpiece formed of a high-toughness metal material or a high-hardness material with a long tool protruding length (for example, L/D is 4 or more), it is possible to prevent the chattering vibration or bending and to prevent the chipping. Accordingly, it is possible to stably perform a cutting process with a high accuracy.

Further, since it is possible to prevent the chattering vibration or bending and to improve the cutting edge strength in this way, it is possible to improve the cutting speed and the processing efficiency.

Further, in the embodiment, the radial rake angle δ in the entire edge length region of the cutting edge 13 of the corner R is set to a negative value.

That is, since the radial rake angle δ is a negative angle in the entire region of the central angle of 90° of the cutting edge 13 of the corner R, the large cutting angle of the cutting edge 13 of the corner R can be secured in the entire edge length region and thus the cutting edge strength can be also reliably improved. Thus, it is possible to more reliably prevent the chipping of the cutting edge 13 of the corner R regardless of the type of cutting process.

Further, in the embodiment, the chamfered surface 15 includes the entire edge length region of the cutting edge 13 of the corner R.

Accordingly, even when chips are generated at any portion of the edge length region of the cutting edge 13 of the corner R during the cutting process, the chips rub against the chamfered surface 15 and are discharged. Thus, since the rake face 14 of the cutting edge 13 of the corner R is simply formed by the chamfered surface 15 formed as one flat or curved surface, it is possible to stabilize the chip discharge performance.

Further, since the rake face 14 of the cutting edge 13 of the corner R can be formed by one chamfered surface 15, it is possible to prevent a sudden change in cutting angle in the entire edge length region of the cutting edge 13 of the corner R and to more stably improve the cutting edge strength.

Further, since it is possible to simply form the cutting edge 13 of the corner R by one step in such a manner that the chamfered surface 15 is ground by gash machining at the time of manufacturing the tool, the tool is easily manufactured. That is, in this case, the chamfered surface 15 can be also called a corner R gash.

Further, in the embodiment, since the chamfered surface 15 extends beyond the boundary point Q between the cutting edge 13 of the corner R and the outer peripheral cutting edge 9 toward a base end side in the direction of the rotation center axis C from the rake face 14 of the cutting edge 13 of the corner R for the chambered surface 15 to be formed even in the rake face 10 of the outer peripheral cutting edge 9, the following operational effect is obtained.

In general, since the boundary point Q between the cutting edge 13 of the corner R and the outer peripheral cutting edge 9 is a portion in which two cutting edges having different shapes are connected to each other, the axial rake angle, the radial rake angle, or the cutting angle changes from the front end side to the base end side in the direction of the rotation center axis C with the boundary point Q interposed therebetween. For this reason, a cutting load in the vicinity of the boundary point Q easily increases during the cutting process.

Here, in the embodiment, the chamfered surface 15 is formed on the rake face 10 of the outer peripheral cutting edge 9 beyond the boundary point Q from the rake face 14 of the cutting edge 13 of the corner R. That is, in this case, the rake face of the cutting edge is formed by one chamfered surface 15 in the vicinity of the boundary point Q.

Accordingly, since it is possible to prevent a large change in the axial rake angle, the radial rake angle, or the cutting angle at the front end side to the base end side in the direction of the rotation center axis C with the boundary point Q interposed therebetween, it is possible to prevent a large cutting load from being applied to the vicinity of the boundary point Q. Thus, it is possible to remarkably improve the cutting edge strength of the connection portion between the cutting edge 13 of the corner R and the outer peripheral cutting edge 9 and to prolong the tool life.

Additionally, for example, when the cutting amount (ap) in the direction of the rotation center axis C during the cutting process is set to be the same as the radius r of the cutting edge 13 of the corner R, the vicinity of the boundary point Q cuts into the work hardened layer processed immediately before so that the cutting load in the vicinity of the boundary point Q easily increases. However, according to the above-described configuration of the embodiment, also in such a case, the cutting edge strength of the cutting edge is sufficiently secured.

Further, since the length W in which the chamfered surface 15 extends to the rake face 10 of the outer peripheral cutting edge 9 beyond the boundary point Q between the cutting edge 13 of the corner R and the outer peripheral cutting edge 9 to the base end side in the direction of the rotation center axis C from the rake face 14 of the cutting edge 13 of the corner R is set to be equal to or larger than 0.02 r and equal to or smaller than 0.5 r in terms of the distance from the boundary point Q, it is possible to prevent a decrease in tool diameter while obtaining an effect of reducing a cutting load in the vicinity of the boundary point Q.

That is, since the length W is 0.02 r or more, it is possible to reliably prevent a large change in the axial rake angle, the radial rake angle, or the cutting angle in the vicinity of the boundary point Q between the cutting edge 13 of the corner R and the outer peripheral cutting edge 9 and to stabilize an effect of preventing a cutting load.

Further, since the length W is 0.5 r or less, it is possible to prevent a problem in which the outer peripheral cutting edge 9 is excessively retracted in the direction opposite to the tool rotation direction R by forming the chamfered surface 15. That is, the flank angle is generally given to the flank face of the outer peripheral cutting edge 9. For this reason, when the large chamfered surface 15 is formed on the rake face 10 of the outer peripheral cutting edge 9, the outer peripheral cutting edge 9 is retracted in the direction opposite to the tool rotation direction R due to the large chamfered surface. In this case, it is not desirable in that the outer diameter of the outer peripheral cutting edge 9 decreases as the outer diameter influences the processing accuracy. Here, since the length W is set to 0.5 r or less, it is possible to prevent a decrease in tool diameter sufficient to influence the cutting accuracy.

Further, in the embodiment, since the rotationally most projecting point M which protrudes furthest in the tool rotation direction R is disposed on the cutting edge 13 of the corner R among the cutting edge 13 of the corner R and the outer peripheral cutting edge 9 and the rotationally most projecting point M is disposed in a range of a radial angle θ of 40° to 55° on the cutting edge 13 of the corner R in the modified example shown in FIG. 15, it is possible to improve the chip discharge performance while obtaining the above-described effect in a state where the axial rake angle Ar2 in the vicinity of the bottom cutting edge 11 of the cutting edge 13 of the corner R is reliably set to a negative angle.

That is, since the rotationally most projecting point M of the cutting edge 13 of the corner R is located at the position of a radial angle θ of 40° or more, it is possible to prevent the rotationally most projecting point M from approaching the bottom cutting edge 11 and to reliably set the axial rake angle Ar2 at the reference point RP of the cutting edge 13 of the corner R to a negative value. Accordingly, it is possible to stably obtain an effect of preventing the chipping or an effect of preventing the chattering vibration.

Further, as for the cutting started from the rotationally most projecting point M of the cutting edge 13 of the corner R during the cutting process, the cutting range is enlarged at the front end side and the base end side in the direction of the rotation center axis C along with the rotation of the tool. That is, since the axial rake angle of the front end side portion in relation to the rotationally most projecting point M of the cutting edge 13 of the corner R is set to a negative angle, chips tend to be directed toward the front end side of the tool. Further, since the axial rake angles at the base end side portion in relation to the rotationally most projecting point M of the cutting edge 13 of the corner R and the outer peripheral cutting edge 9 are set to a positive angle, chips are directed to the base end side of the tool.

Then, since the rotationally most projecting point M of the cutting edge 13 of the corner R is located at a position of a radial angle θ of 55° or less, the rotationally most projecting point M can approach the front end side of the tool in the cutting edge 13 of the corner R. Accordingly, it is possible to improve the chip discharge performance while increasing the amount of chips discharged toward the base end side of the tool.

Further, in the modified example shown in FIG. 15, since the size of the axial rake angle Ar1 of the cutting edge 13 of the corner R at the boundary point Q between the cutting edge 13 of the corner R and the outer peripheral cutting edge 9 is set to be equal to or larger than 90% and equal to or smaller than 110% in a state where the size of the twist angle ε of the outer peripheral cutting edge 9 is 100%, the following operational effect is obtained.

In general, since the boundary point Q between the cutting edge 13 of the corner R and the outer peripheral cutting edge 9 is a portion in which two cutting edges having different shapes are connected to each other, the axial rake angle changes at the front end side and the base end side in the direction of the rotation center axis C with the boundary point Q interposed therebetween.

Specifically, when the axial rake angle Ar1 of the cutting edge 13 of the corner R at the boundary point Q decreases with respect to the twist angle ε of the outer peripheral cutting edge 9, the cutting edge in the vicinity of the boundary point Q is formed in a convex shape which protrudes in the tool rotation direction R. Further, when the axial rake angle Ar1 of the cutting edge 13 of the corner R at the boundary point Q increases with respect to the twist angle ε of the outer peripheral cutting edge 9, the cutting edge in the vicinity of the boundary point Q is formed in a concave shape which is recessed toward the opposite side to the tool rotation direction R.

According to the modified example of FIG. 15, since the axial rake angle Ar1 of the cutting edge 13 of the corner R at the boundary point Q is set to be equal to or larger than 90% and equal to or smaller than 110% in a state where the twist angle ε of the outer peripheral cutting edge 9 is 100%, it is possible to prevent the cutting edge in the vicinity of the boundary point Q from being formed in a convex shape or a concave shape and to smoothly connect the outer peripheral cutting edge 9 and the cutting edge 13 of the corner R to each other. Accordingly, it is possible to prevent a large cutting load from being applied to the vicinity of the boundary point Q.

Further, in the embodiment, since the radial rake angle δ becomes a maximum value in a region located between the boundary point Q between the cutting edge 13 of the corner R and the outer peripheral cutting edge 9 and the reference point RP in the cutting edge 13 of the corner R, the following operational effect is obtained.

A region (an intermediate portion) located between the boundary point Q with respect to the outer peripheral cutting edge 9 of which the axial rake angle Ar1 is set to a positive value in the cutting edge 13 of the corner R and the reference point RP of which the axial rake angle Ar2 is set to a negative value includes a portion (the rotationally most projecting point M) which protrudes furthest in the tool rotation direction R and corresponds to a position in which the workpiece starts to be bitten.

When the radial rake angle δ in the above-described region is set to a maximum value (the largest to the positive angle side) in the cutting edge 13 of the corner R, the sharpness of this area is increased. That is, since the biting to the workpiece is satisfactory, the chattering vibration is prevented and the work surface accuracy is improved.

(Other Configurations Included in Present Invention)

Additionally, the present invention is not limited to the above-described embodiment and various modifications can be made without departing from the spirit of the present invention.

For example, in the above-described embodiment, the chamfered surface 15 extends beyond the boundary point Q between the cutting edge 13 of the corner R and the outer peripheral cutting edge 9 toward a base end side in the direction of the rotation center axis C from the rake face 14 of the cutting edge 13 of the corner R for the chambered surface 15 to be formed even in the rake face 10 of the outer peripheral cutting edge 9, but the present invention is not limited thereto. That is, the chamfered surface 15 is formed on the rake face 14 of the cutting edge 13 of the corner R, but may not be formed on the rake face 10 of the outer peripheral cutting edge 9.

Further, although not particularly shown in the drawings, the chamfered surface 15 may extend over the boundary point between the cutting edge of the corner R and the bottom cutting edge 11 inward in the radial direction from the rake face 14 of the cutting edge 13 of the corner R for the chambered surface 15 to be formed even in the rake face 12 of the bottom cutting edge 11.

In general, since the boundary point P between the cutting edge 13 of the corner R and the bottom cutting edge 11 is a portion in which two cutting edges having different shapes are connected to each other, the axial rake angle, the radial rake angle, or the cutting angle changes at the inside and outside in the radial direction with the boundary point P interposed therebetween. For this reason, the cutting load in the vicinity of the boundary point P tends to easily increase during the cutting process.

Here, when the chamfered surface is formed on the rake face 12 of the bottom cutting edge 11 beyond the boundary point P from the rake face 14 of the cutting edge 13 of the corner R, the rake face of the cutting edge in the vicinity of the boundary point P is formed by one chamfered surface 15.

Accordingly, since it is possible to prevent a large change in the axial rake angle, the radial rake angle, or the cutting angle at the inside and outside in the radial direction with the boundary point P interposed therebetween, it is possible to prevent a large cutting load from being applied to the vicinity of the boundary point P. Thus, the cutting edge strength at the connection portion between the cutting edge 13 of the corner R and the bottom cutting edge 11 is remarkably improved and the tool life is prolonged.

Further, in the above-described embodiment, the maximum value of the radial rake angle δ is set to a range of a radial angle θ of 30° to 50° in the cutting edge 13 of the corner R, but the present invention is not limited thereto. That is, the maximum value of the radial rake angle δ may be set to be smaller than a radial angle θ of 30° or larger than a radial angle θ of 50°. For example, when the radial angle θ is 90°, the radial rake angle δ may be set to the maximum value.

Further, in the above-described embodiment, in addition to a cemented carbide containing tungsten carbide (WC) and cobalt (Co), the materials of the base material of the insert 5 may be, for example, cermet, high speed steel, titanium carbide, silicon carbide, silicon nitride, aluminum nitride, aluminum oxide, ceramics composed of a mixture thereof, a cubic boron nitride sintered body, a diamond sintered body, hard-phase materials composed of polycrystalline diamond or cubic boron nitride, and an ultra-high pressure sintered body obtained by firing binder-phase materials such as ceramics and iron group metals under an ultra-high pressure.

When the tool main body 1 and the shank portion are manufactured, for example, using alloy tool steel such as SKD 61, a carbide shank type can be used in which the tool main body 1 is formed of alloy tool steel such as SKD 61, the shank portion is formed of cemented carbide, and the shank portion is joined to the tool main body 1.

In addition, the configurations (components) described in the embodiments, the modified examples, and the further description shown above may be subjected to combination, addition, omission, substitution, and other modifications in a range not departing from the spirit of the present invention. Further, the present invention is not limited to the above-described embodiments and is limited only to claims.

EXAMPLES

Hereinafter, the present invention will be described in detail with reference to examples. However, the present invention is not limited to these examples.

(Manufacturing of Indexable Radius End Mill and Cutting Test)

First, an indexable radius end mill of Example 1 of the present invention was prepared as the embodiment of the present invention. As the tool main body 1, a carbide shank type having an edge diameter of 20 mm, a shank diameter of 20 mm, a total length of 220 mm, a neck length of 120 mm, and a neck diameter of 19 mm was used.

As the base material of the tool main body, a base material obtained by bonding cemented carbide to a material equivalent to SKD 61 with a brazing material was used. Then, the exterior form was adjusted by lathe processing and the shank portion was finished by a polishing process. Further, the insert fixed portion of the mounting seat was formed by milling at a machining center. As the clamp screw for attaching and detaching the insert, a screw size with a nominal diameter of M6 and a pitch of 0.75 mm was used.

The base material of the insert 5 was formed of a WC-Co-based cemented carbide and the coating film on the insert surface was subjected to a CrSi based nitride coating.

Figure 5:
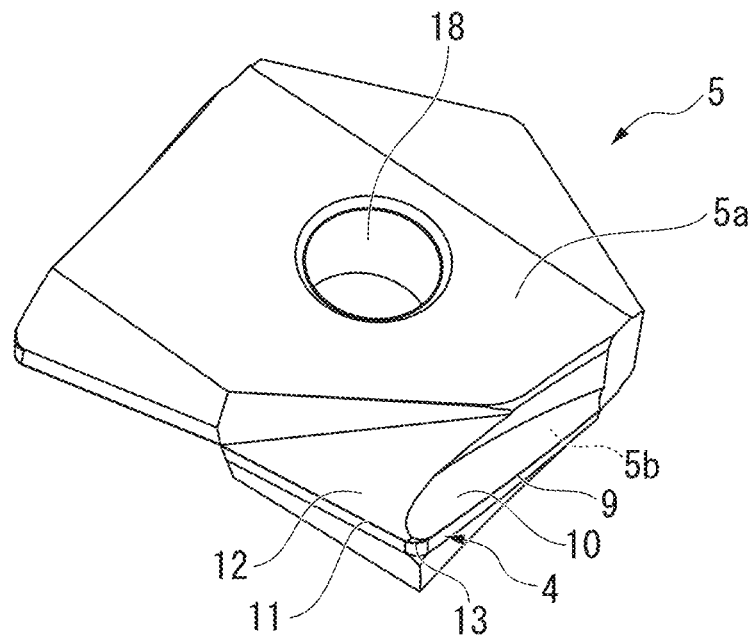
FIG. 5 is a perspective view showing an insert attached to the indexable rotary cutting tool.
Figure 6:
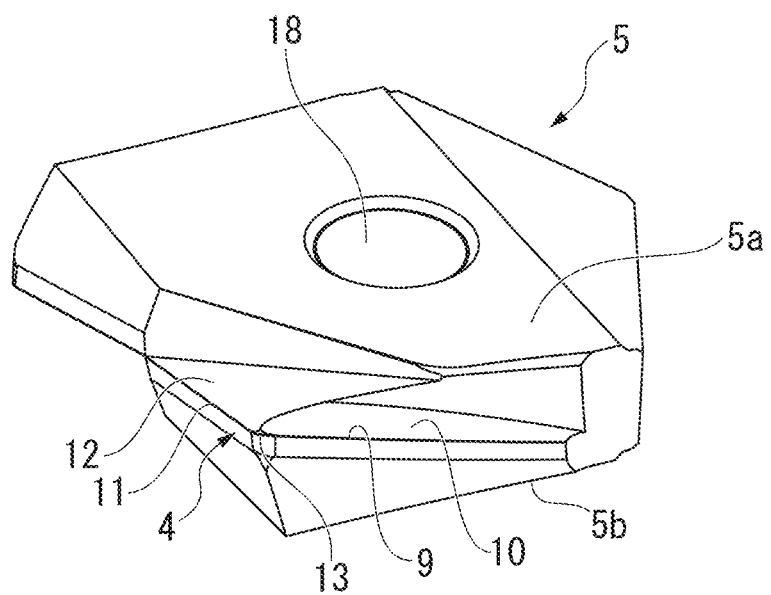
FIG. 6 is a perspective view showing the insert as viewed from an angle different from that of FIG. 5.

The shape of the insert was a substantially planar shape as shown in FIG. 5, the dimension r of the cutting edge of the corner R was 1 mm, the thickness dimension T was 5.2 mm, the length of the outer peripheral cutting edge in a side view of the insert was 7 mm, and the axial rake angle (that is, the twist angle ε) of the outer peripheral cutting edge in the side view of the insert was set to a positive value of 15°.

The bottom cutting edge was inclined with respect to the horizontal plane perpendicular to the rotation center axis and passing through the boundary point between the bottom cutting edge and the cutting edge of the corner R to gradually extend toward the base end side in the rotation center axis direction going from the boundary point toward the inside in the radial direction and the positive middle/low inclination angle corresponding to the inclined angle was set to 3°.

For the main parameters allowing the inset shape of Example 1 of the present invention to be exhibited, the axial rake angle (Ar1) at the position of the boundary point (Q) in the cutting edge of the corner R was set to 14° and the axial rake angle (Ar2) of the cutting edge of the corner R at the position of the boundary point (P) was set to −8°.

The boundary point (Q) shown in FIG. 10 is a boundary point between the cutting edge of the corner R and the outer peripheral cutting edge and is also the outermost peripheral point of the outer peripheral cutting edge in the rotation locus of the cutting edge rotating about the rotation center axis. Such a theoretical (ideal) boundary point (Q) is a point in which the radial angle (θ) of the cutting edge of the corner R becomes 90°.

In the indexable rotary cutting tool of the present invention, the chamfered surface was formed on the rake face of the outer peripheral cutting edge beyond the boundary point from the rake face of the cutting edge of the corner R. When the length in which the chamfered surface extends to the base end side in the rotation center axis direction from the boundary point between the cutting edge of the corner R and the outer peripheral cutting edge is indicated by a value W, it is desirable that the value W be equal to or larger than 0.02 r and equal to or smaller than 0.50 r in a state where the radius of the cutting edge of the corner R is indicated by r.

Accordingly, since the boundary point between the cutting edge of the corner R and the outer peripheral cutting edge is a portion in which two cutting edges having different shapes are connected to each other, a large change in the axial rake angle, the radial rake angle, or the cutting angle at the front end side and the base end side in the rotation center axis direction with the boundary point interposed therebetween is prevented. As a result, it is possible to expect that a large cutting load being applied to the vicinity of the boundary point during the cutting process can be prevented.

Since the length of the value W is 0.02 r or more, it is possible to reliably prevent a large change in the axial rake angle, the radial rake angle, or the cutting angle in the vicinity of the boundary point between the cutting edge of the corner R and the outer peripheral cutting edge. As a result, this is desirable in that an effect of reducing a cutting load in the vicinity of the boundary point can be obtained.

Further, since the length of the value W is 0.50 r or less, this is desirable in that a decrease in tool diameter sufficient to influence the cutting process accuracy due to the backward movement of the outer peripheral cutting edge in the direction opposite to the tool rotation direction can be prevented by forming the chamfered surface.

In view of the above-described circumstances, in Example 1 of the present invention, the insert was manufactured so that the value W was 0.05 mm corresponding to 0.05 r.

FIG. 17 shows a profile of the radial rake angle (δ) in the cutting edge of the corner R of Example 1 of the present invention. FIG. 16 shows a schematic diagram of the cross-section of the cutting edge when the radial angle (θ) of the cutting edge of the corner R of Example 1 of the present invention is 40° (a right lower diagram of FIG. 16).

From FIG. 17, the value v of the radial rake angle in the case of the radial angle (θ) of 0° (the boundary point P) of Example 1 of the present invention was set to −8°, the value α of the radial rake angle in the case of the radial angle (θ) of 5° (the reference point RP) was set to −7°, and the value β of the radial rake angle (the boundary point Q) in the case of the radial angle (θ) of 90° was set to −3°. At the position of the radial angle (θ) of 40°, the radial rake angle (δ) has a minimum value. The radial rake angle (δ) at this time is −0.8°.

Next, Comparative Example 2 was manufactured based on the basic components of Example 1 of the present invention. In the cutting edge of the corner R of Comparative Example 2, the value α of the radial rake angle in the case of the radial angle (θ) of 5° (the reference point RP) was set to −3° and the value β of the radial rake angle in the case of the radial angle (θ) of 90° (the boundary point Q) was set to −8°.

Further, in order to compare the performances of Example 1 of the present invention and Comparative Example 2, the insert of Conventional Example 3 was prepared. The insert of Conventional Example 3 was an insert manufactured by Mitsubishi Hitachi Tool Co., Ltd. The model names were Radius Precision, ARPF type ZCFW 200-R1.0, PTH08M type.

tured in this way were mounted on the tool main body of the indexable radius end mill and a cutting evaluation was performed. The tool main body to which each of the inserts was mounted was mounted on a chuck corresponding to a tool holding implement and was mounted on a spindle of a milling machine. The cutting process was performed by using the two sets of cutting conditions below.

At this time, the maximum wear width on flank face VBmax (mm) at the time of increasing the cutting distance (m) was measured at predetermined time intervals. The lifespan of the cutting edge was determined as a time point at which the value VBmax reached 0.2 (mm). Further, the damaged state of the cutting edge when the life of the cutting edge had almost ended was photographed. The measurement results are shown in Table 1.

The maximum wear width on flank face VBmax (mm) mentioned herein was obtained by measuring the maximum value of the wear width at the time of observing the flank face of the cutting edge contributing to the cutting process.

TABLE 1

| | Rake angle in radiation direction | | | Axial rake angle | | Cutting distance (@VBmax value: 0.2 mm) | |
|---|---|---|---|---|---|---|---|
| | Bottom | | Bottom | Bottom | Outer | | |
| | surface portion (boundary point P) θ = 0 (°) | Bottom surface portion (reference point RP) θ = 5 Value α (°) | surface portion (boundary point q) θ = 90 Value β (°) | surface portion (boundary point P) Ar2 (°) | peripheral portion (boundary point Q) Ar1 (°) | Standing wall side part contour machining (m) | Face milling machining (m) |
| Example 1 of the present invention | −8 | −7 | −3 | −8 | 14 | 264 | 15.3 |
| Comparative Example 2 | −3 | — | −8 | −3 | 14 | 210 | 9.8 |
| Conventional Example 3 | 0 | 0 | 0 | 0 | 0 | 42.6 | 3.7 |

Figure 18:
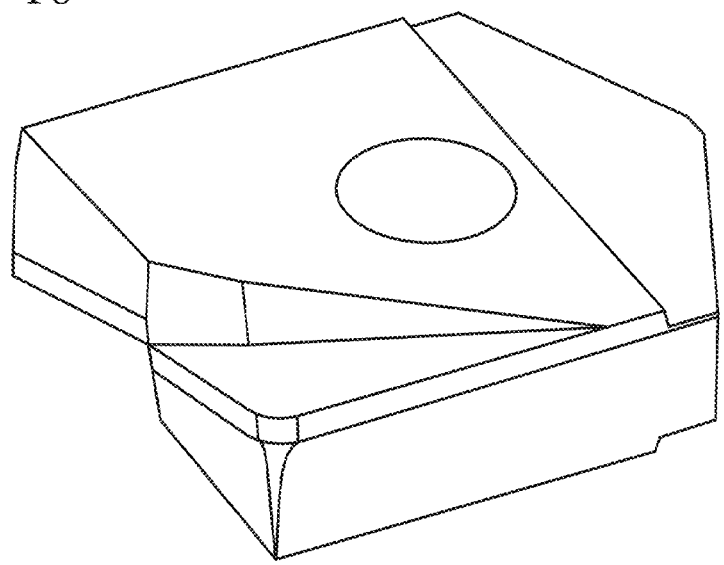
FIG. 18 is a perspective view showing an insert of Conventional Example 3.

The insert of Conventional Example 3 was manufactured to have substantially the same form as that of the insert of Example 1 of the present invention using the same materials. However, Conventional Example 3 did not have a particular configuration of the present invention. Specifically, since the chamfered surface of the cutting edge of the corner R was not provided, the specification of the cutting edge of the corner R was different from that of the present invention. In Comparative Example 3, the rake face of the bottom cutting edge, the rake face of the cutting edge of the corner R, and the outer peripheral cutting edge were formed to be flush with one another and the axial rake angles thereof were set to 0°. Further, the rake face of the bottom cutting edge and the rake face of the cutting edge of the corner R were formed to be flush with the chip removal groove extending to the base end side of the rake face of the bottom cutting edge. The base material of the insert of Conventional Example 3 was formed of a WC-Co based cemented carbide and a TiSi based nitride coating was coated as the coating of the surface of the insert. The shape of the insert was a substantially planar shape as shown in FIG. 18, the dimension r of the cutting edge of the corner R was 1 mm, the thickness dimension T was 5.2 mm, the length of the outer peripheral cutting edge in the side view of the insert was 6 mm, the axial rake angle of the outer peripheral cutting edge was set to 0°, and the positive middle/low inclination angle of the bottom cutting edge was set to 1°.

The inserts of Example 1 of the present invention, Comparative Example 2, and Conventional Example 3 manufac- In the test, chrome alloy stainless steel tool steel was used as the material of the workpiece and dimensions of 100× 100×250 (mm) were used. The workpiece was processed under two cutting conditions below. For one condition, an upright wall machining process was performed as a side shoulder milling/finishing process to form an upright wall side face portion in the depth direction from the surface portion. For the other condition, a bottom surface machining process was performed as a face milling machining.

<Cutting Conditions 1>
Workpiece: chrome alloy stainless steel tool steel (for plastic mold)
Workpiece hardness: 52 HRC (Rockwell hardness)
Cutting speed (Vc): 120 m/minute
Rotation speed (n) of spindle: 1910 rotations/minute
Feed per each edge (fz): 0.25 mm (constant)
Table feed (Vf): 955 mm/minute
Axial cut depth (ap): 1.0 mm (constant)
Radial cut width (ae): 0.5 mm (constant)
Tool protrusion: 60 mm
Machining method: dry type, standing wall side part contour machining <Cutting Conditions 2>
Workpiece: chrome alloy stainless steel tool steel (for plastic mold)
Workpiece hardness: 52 HRC
Cutting speed (Vc): 120 m/minute
Rotation speed (n) of spindle: 1910 rotations/minute
Feed per each edge (fz): 0.25 mm (constant)

Figure 19:
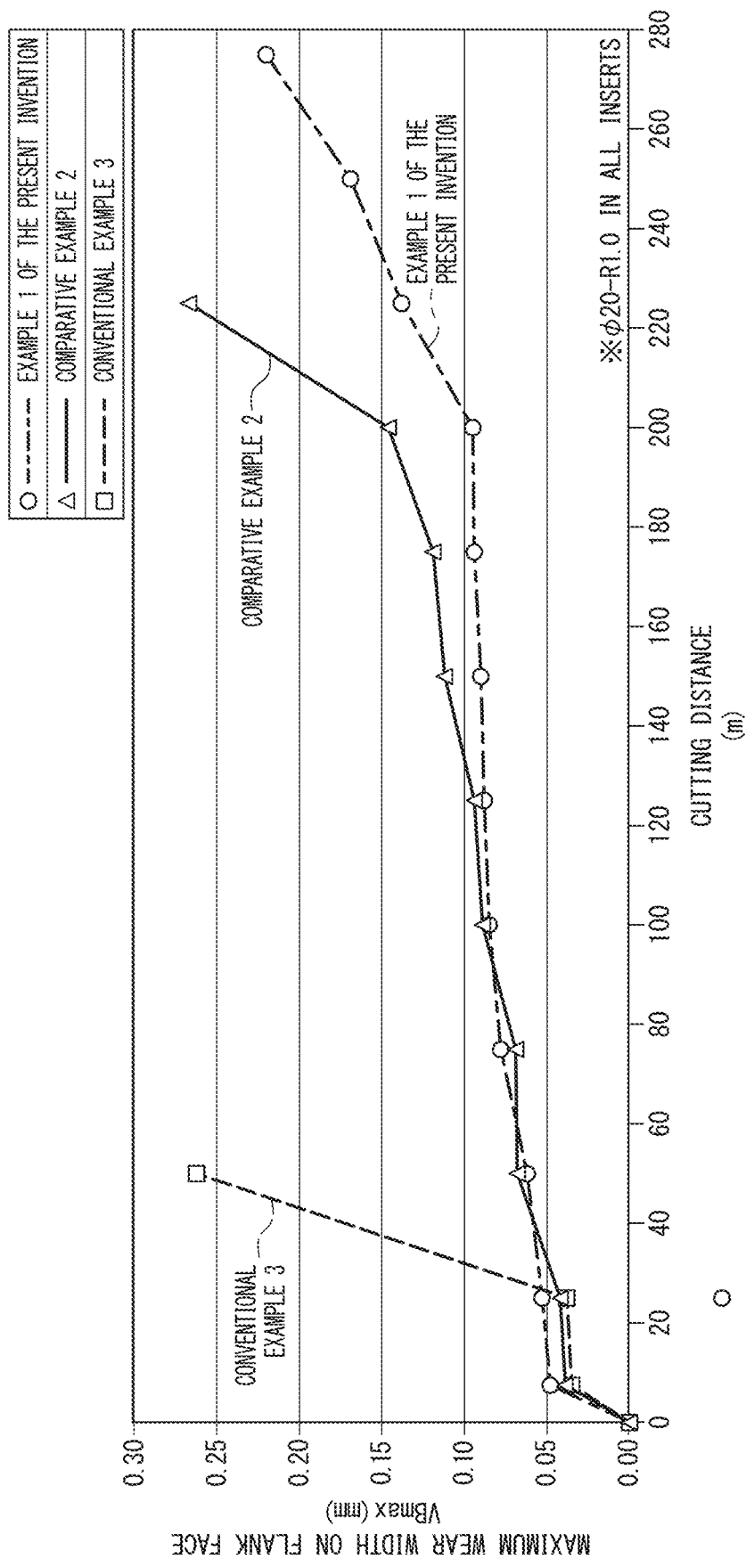
FIG. 19 is a graph showing results obtained by measuring a maximum wear width on flank face VBmax (mm) at predetermined intervals while increasing a cutting distance (m) during contour machining for an upright wall side face portion using Cutting Conditions 1 by inserts of Example 1 of the present invention, Comparative Example 2, and Conventional Example 3.
Figure 20:
FIG. 20 is a diagram showing a picture of a damaged state of a cutting edge when the cutting edge reaches the end of life in a cutting test.
Figure 20:
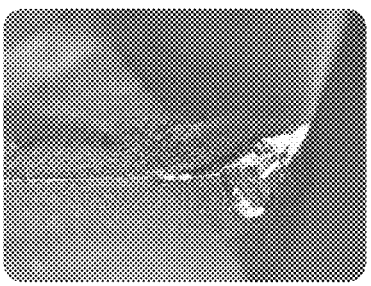
Figure 20:
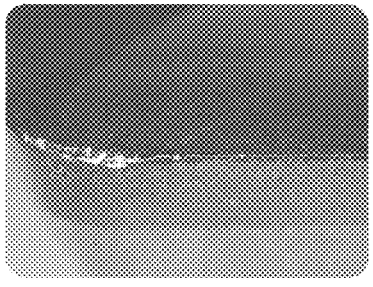
Figure 20:
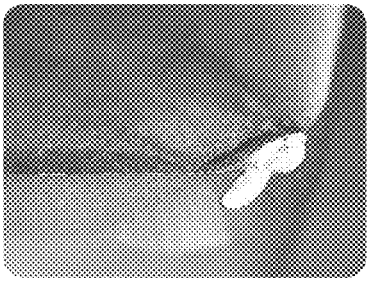
Figure 20:
Figure 20:
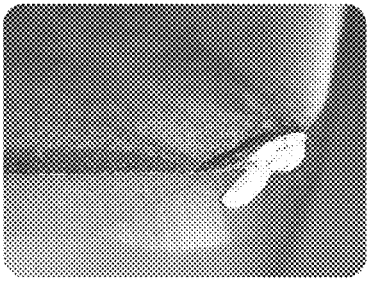

Table feed (Vf): 955 mm/minute
Axial cut depth (ap): 0.5 mm (constant)
Radial cut width (ae): 10 mm (constant)
Tool protrusion: 60 mm
Machining method: dry type, face milling machining FIG. 19 shows a result obtained by measuring the maximum wear width on flank face VBmax (mm) at predetermined intervals while increasing the cutting distance (m) in the contour machining for the upright wall side face portion under Cutting Conditions 1 for each of the inserts of Example 1 of the present invention, Comparative Example 2, and Conventional Example 3. FIG. 20 shows a picture of a damage state of the cutting edge when the life of the cutting edge had almost ended.

When the condition of the cutting speed (the value Vc) was 120 m/minute, Example 1 of the present invention of which the value β of the radial rake angle was −3° showed a satisfactory result since the cutting distance obtained when VBmax reached a specific value was 264 (m). Further, in Comparative Example 2 of which the value β was −7°, the cutting distance obtained when VBmax reached a specific value was 210 (m). Since the cutting distance could not exceed a target value of 250 (m), a satisfactory result could not be obtained.

Here, the results of Example 1 of the present invention and Comparative Example 2 will be examined. Since the value β of Example 1 of the present invention approaches the positive angle side while having the negative value, it is possible to secure the sharpness in the vicinity of the outer peripheral cutting edge in the cutting edge of the corner R during the side face machining process and thus it is assumed that the biting to the upright wall surface would be able to be improved. Thus, since a force separating the tool from the upright wall surface is not applied from the workpiece to the tool during the cutting process, it is considered that the chattering vibration is prevented and the machining process is stably performed.

Figure 21:
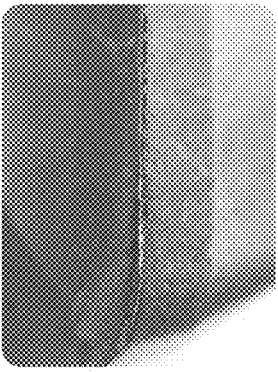
FIG. 21 is a diagram showing a picture obtained by observing temporal change in damaged state of the cutting edge in the cutting test.
Figure 21:
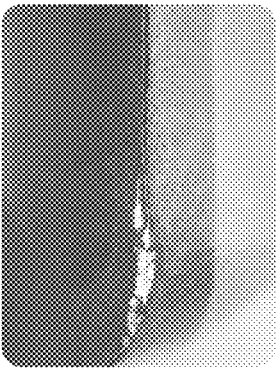
Figure 21:
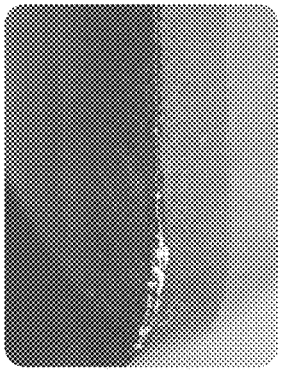
Figure 21:
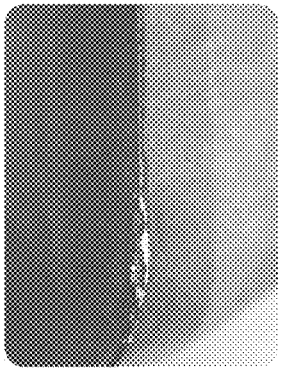

Meanwhile, since the value β of Comparative Example 2 was inflexibly set to the negative direction, the damage was accelerated and thus a result in which the tool life was shorter than that of Example 1 of the present invention was obtained. According to the picture of FIG. 21 obtained by observing a change in damage state with time, the damage to the rake face increased at the time point of the initial cutting distance of 7.5 mm and the damage progressed from the rake face wear position at the subsequent time point of 150 m midway. At the end, it is considered that the damage of the rake face exceeded a predetermined region so that the damage of the flank face was accelerated.

Further, since the setting of the value W of Example 1 of the present invention remarkably improved the cutting edge strength at the connection portion between the cutting edge of the corner R and the outer peripheral cutting edge, it is considered that the tool life can be effectively prolonged. From the above-described fact, it was proved that Example 1 of the present invention showed a satisfactory result.

Further, in Conventional Example 3, since a large defect occurred at the cutting edge portion based on the observation at the time point at which the cutting distance was 48 (m), a result in which the tool life was short was obtained. Here, it is considered that the chattering vibration occurrence rate is high since the biting to the workpiece starts in a line-contact state as the axial rake angle of the cutting edge of the corner R biting into the workpiece is the same as the axial rake angle (the twist angle) of the outer peripheral cutting edge.

Figure 22:
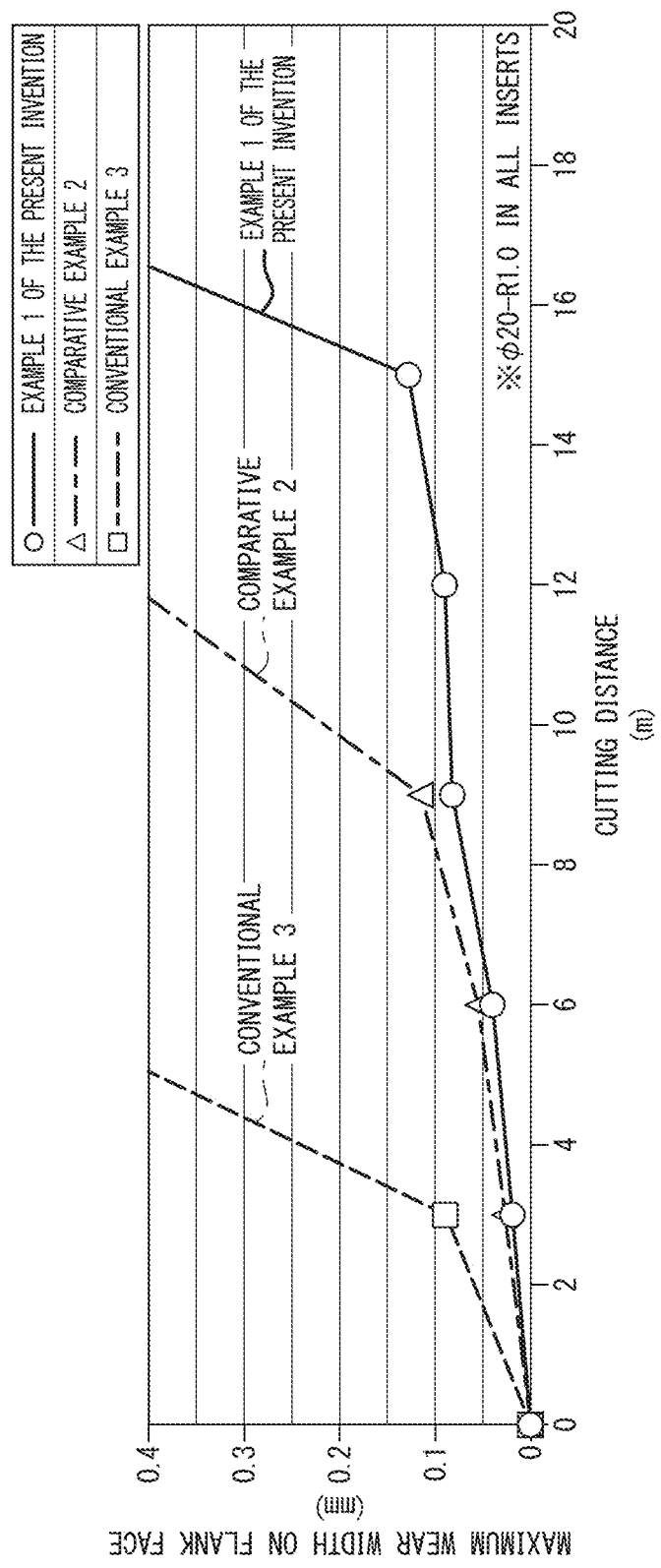
FIG. 22 is a graph showing a result obtained by measuring the maximum wear width on flank face VBmax (mm) at predetermined intervals while increasing the cutting distance (m) in a face milling machining using Cutting Conditions 2 by inserts of Example 1 of the present invention, Comparative Example 2, and Conventional Example 3.

FIG. 22 shows a result obtained by measuring the maximum wear width on flank face VBmax (mm) at predetermined intervals while increasing the cutting distance (m) for the face milling machining using Cutting Conditions 2 for each of the inserts of Example 1 of the present invention, Comparative Example 2, and Conventional Example 3. FIG. 20 shows a picture of the damage state of the cutting edge when the life of the cutting edge had almost ended.

When the condition of the cutting speed (the value Vc) was 120 m/minute, Example 1 of the present invention of which the value α of the radial rake angle was −7° showed a satisfactory result since the cutting distance obtained when VBmax reached a specific value was 15.3 (m). Further, in Comparative Example 2 of which the value α was −3°, the cutting distance obtained when VBmax reached a specific value was 9.8 (m). Since the cutting distance could not exceed a target value of 10.0 (m), a satisfactory result could not be obtained.

Here, the results of Example 1 of the present invention and Comparative Example 2 will be examined Since the value α of Example 1 of the present invention is set to a negative value and a small value, the biting of the cutting edge during the planar process is prevented. As a result, since an effect of preventing the chipping or an effect of preventing the chattering vibration can be obtained, it is considered that the machining process is stably performed.

Meanwhile, since the value α of Comparative Example 2 approaches the positive angle side while having the negative value, it is assumed that an effect of preventing chipping or chattering vibration during surface processing would not be able to be easily obtained. From the above-described fact, it was proved that Example 1 of the present invention showed a satisfactory result.

Further, in Conventional Example 3, since a large defect occurred at the cutting edge portion based on the observation at the time point at which the cutting distance was 6 (m), a result in which the tool life was short was obtained. Here, this is because a phenomenon easily occurs in which the front end of the cutting edge is pulled so as to get into the workpiece at the time of biting into the workpiece in the vicinity of the bottom cutting edge for performing a face milling process on the surface of the workpiece during the cutting process. That is, it is considered that the machining process becomes unstable since the chipping or chattering vibration easily occurs when the cutting edge is put in the excessively biting state.

INDUSTRIAL APPLICABILITY

Since the indexable rotary cutting tool and the insert of the present invention can prevent the chattering vibration or bending and prevent the chipping even when the cutting process is performed on a workpiece formed of a high-toughness metal material or a high-hardness material while the tool protrusion length is long (for example, L/D is 4 or more), it is possible to stably perform a high-accuracy cutting process with high efficiency for a long period of time. Thus, the present invention has industrial applicability.

REFERENCE SIGNS LIST

1: Tool main body
2: Tip end portion
3: Mounting seat
4: Cutting edge portion
5: Insert 6: Indexable radius end mill (indexable rotary cutting tool)
7: Insert fit groove
8: Clamp screw
9: Outer peripheral cutting edge
10: Rake face of outer peripheral cutting edge
11: Bottom cutting edge
12: Rake face of bottom cutting edge
13: Cutting edge of corner R
14: Rake face of cutting edge of corner R
15: Chamfered surface (corner R gash)
16, 17: Chip removal groove
A: Predetermined point on cutting edge of corner r
Ar1, Ar2: Axial rake angle (axial rake)
C: Rotation center axis
M: Rotationally most projecting point
O: Arc center point
Pr: Reference plane
Q: Boundary point
R: Tool rotation direction
r: Radius of cutting edge of corner R
RP: Reference point
VL: Virtual straight line
VS: Virtual plane
W: Length
$\delta$: Radial rake angle (true rake angle)
$\varepsilon$: Twist angle
$\theta$: Radial angle
$\theta_{RP}$: Radial angle of reference point

The invention claimed is:

1. An indexable rotary cutting tool comprising: a tool body; and an insert having a cutting edge portion, the insert being detachably mounted on a mounting seat provided at a tip end portion of the tool main body,
wherein the mounting seat includes:
a insert fit groove in a slit shape which is formed at the tip end portion of the tool main body to extend in a radial direction orthogonal to a rotation center axis including a tool rotation center axis; and
a clamp screw configure to fix the insert inserted into the insert fit groove,
wherein the cutting edge portion of the insert includes:
an outer peripheral cutting edge which extends along the rotation center axis direction;
a rake face of the outer peripheral cutting edge;
a bottom cutting edge which extends along the radial direction;
a rake face of the bottom cutting edge;
a cutting edge of a corner R which connects an outer end of the bottom cutting edge in the radial direction to a front end of the outer peripheral cutting edge in the rotation center axis direction and is formed in an arc shape to protrude toward an outer peripheral side of the tip end portion of the tool main body;
a rake face of the cutting edge of the corner R;
a chamfered surface which is formed in at least the rake face of the cutting edge of the corner R;
a chip removal groove which is formed at a base end side of the rake face of the bottom cutting edge in the rotation center axis direction; and
a chip removal groove which is formed at the inside of the rake face of the outer peripheral cutting edge in the radial direction, and
wherein, within a virtual plane, which is perpendicular to a reference plane including a predetermined point on the cutting edge of the corner R and the rotation center axis; and includes a virtual straight line passing through an arc center point of the cutting edge of the corner R and the predetermined point, a true rake angle corresponding to an angle in which the rake face of the cutting edge of the corner R is inclined with respect to the reference plane is defined as a radial rake angle,
an angle in which the virtual straight line projected to the reference plane is inclined with respect to the rotation center axis within the reference plane is defined as a radial angle,
a point in which the virtual straight line inclined by the radial angle of 5° intersects the cutting edge of the corner R is defined as a reference point, and wherein
a twist angle of the outer peripheral cutting edge has a positive value,
an axial rake angle of the cutting edge of the corner R at a boundary point between the cutting edge of the corner R and the outer peripheral cutting edge has a positive value,
the axial rake angle of the cutting edge of the corner R at the reference point has a negative value,
the radial rake angle at least in a region between the boundary point and the reference point in an entire edge length region of the cutting edge of the corner R has a negative value, and
the radial rake angle of the cutting edge of the corner R at the reference point is smaller than the radial rake angle of the cutting edge of the corner R at the boundary point.

2. The indexable rotary cutting tool according to claim 1, wherein the radial rake angle is set to a negative value in the entire edge length region of the cutting edge of the corner R.

3. The indexable rotary cutting tool according to claim 1, wherein the chamfered surface includes the entire edge length region of the cutting edge of the corner R.

4. The indexable rotary cutting tool according to claim 1, wherein the chamfered surface extends in the rake face of the outer peripheral edge beyond the boundary point between the cutting edge of the corner R and the outer peripheral cutting edge toward a base end side in the rotation center axis direction from the rake face of the cutting edge of the corner R.

5. The indexable rotary cutting tool according to claim 4, wherein a length in which the chamfered surface extends toward the base end side in the rotation center axis direction from the boundary point between the cutting edge of the corner R and the outer peripheral cutting edge equals to or more than 0.02r and equal to or smaller than 0.5r in a condition that a radius of the cutting edge of the corner R is indicated by r.

6. The indexable rotary cutting tool according to claim 1, wherein the chamfered surface extends in the rake face of the bottom cutting edge beyond the boundary point between the cutting edge of the corner R and the bottom cutting edge inward in the radial direction from the rake face of the cutting edge of the corner R.

7. The indexable rotary cutting tool according to claim 1, wherein a rotationally most projecting point which protrudes furthest toward a tool rotation direction in a circumferential direction about the rotation center axis is disposed on the cutting edge of the corner R among the cutting edge of the corner R and the outer peripheral cutting edge, and
wherein the rotationally most projecting point is disposed in a range of the radial angle of 40° or more and 55° or less on the cutting edge of the corner R.

8. The indexable rotary cutting tool according to claim 1, wherein a size of the axial rake angle of the cutting edge of the corner R at the boundary point between the cutting edge of the corner R and the outer peripheral cutting edge is 90% or more and 110% or less in a condition that a size of the twist angle of the outer peripheral cutting edge is 100%.

9. The indexable rotary cutting tool according to claim 1, wherein the radial rake angle has a maximum value in a region located between the reference point and the boundary point between the outer peripheral cutting edge and the cutting edge of the corner R in the cutting edge of the corner R.

10. An insert configured to be detachably mounted on a mounting seat provided at a tip end portion of a tool main body such that the tool body and the insert define an indexable rotary cutting tool, the mounting seat of the tool body comprising: a insert fit groove in a slit shape which is formed at the tip end portion of the tool main body to extend in a radial direction orthogonal to a rotation center axis including a tool rotation center axis; and a clamp screw configure to fix the insert inserted into the insert fit groove,
the insert comprising a cutting edge portion,
the cutting edge portion of the insert including:
an outer peripheral cutting edge which extends along the rotation center axis direction;
a rake face of the outer peripheral cutting edge;
a bottom cutting edge which extends along the radial direction;
a rake face of the bottom cutting edge;
a cutting edge of a corner R which connects an outer end of the bottom cutting edge in
the radial direction to a front end of the outer peripheral cutting edge in the rotation center axis direction and is formed in an arc shape to protrude toward an outer peripheral side of the tip end portion of the tool main body;
a rake face of the cutting edge of the corner R;
a chamfered surface which is formed in at least the rake face of the cutting edge of the corner R;
a chip removal groove which is formed at a base end side of the rake face of the bottom cutting edge in the rotation center axis direction; and
a chip removal groove which is formed at the inside of the rake face of the outer peripheral cutting edge in the radial direction, and
wherein, within a virtual plane, which is perpendicular to a reference plane including a predetermined point on the cutting edge of the corner R and the rotation center axis; and includes a virtual straight line passing through an arc center point of the cutting edge of the corner R and the predetermined point, a true rake angle corresponding to an angle in which the rake face of the cutting edge of the corner R is inclined with respect to the reference plane is defined as a radial rake angle,
an angle in which the virtual straight line projected to the reference plane is inclined with respect to the rotation center axis within the reference plane is defined as a radial angle,
a point in which the virtual straight line inclined by the radial angle of 5° intersects the cutting edge of the corner R is defined as a reference point, and wherein
a twist angle of the outer peripheral cutting edge has a positive value,
an axial rake angle of the cutting edge of the corner R at a boundary point between the cutting edge of the corner R and the outer peripheral cutting edge has a positive value,
the axial rake angle of the cutting edge of the corner R at the reference point has a negative value,
the radial rake angle at least in a region between the boundary point and the reference point of the cutting edge of the corner R has a negative value, and
the radial rake angle of the cutting edge of the corner R at the reference point is smaller than the radial rake angle of the cutting edge of the corner R at the boundary point.

* * * * *